United States Patent
Kim et al.

(10) Patent No.: US 12,334,754 B2
(45) Date of Patent: Jun. 17, 2025

(54) WIRELESS POWER TRANSMISSION APPARATUS

(71) Applicant: LG ELECTRONICS INC., Seoul (KR)

(72) Inventors: Kyunghwan Kim, Seoul (KR); Seonghun Lee, Seoul (KR); Taewook Kwon, Seoul (KR); Hyoungseok Kim, Seoul (KR); Hongkwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 195 days.

(21) Appl. No.: 18/016,585

(22) PCT Filed: Jul. 17, 2020

(86) PCT No.: PCT/KR2020/009486
§ 371 (c)(1),
(2) Date: Jan. 17, 2023

(87) PCT Pub. No.: WO2022/014758
PCT Pub. Date: Jan. 20, 2022

(65) Prior Publication Data
US 2023/0283119 A1    Sep. 7, 2023

(51) Int. Cl.
*H02J 50/70* (2016.01)
*H01F 27/36* (2006.01)
*H02J 50/12* (2016.01)

(52) U.S. Cl.
CPC .............. *H02J 50/70* (2016.02); *H01F 27/36* (2013.01); *H02J 50/12* (2016.02)

(58) Field of Classification Search
CPC .......... H02J 50/70; H02J 50/12; H01F 27/36; H01F 27/366; H01F 27/2804; H01F 38/14
See application file for complete search history.

(56) References Cited

U.S. PATENT DOCUMENTS

| | | | |
|---|---|---|---|
| 2002/0057171 A1* | 5/2002 | Patel | H01F 27/2804 336/200 |
| 2013/0088089 A1* | 4/2013 | Leem | H04B 5/79 307/104 |
| 2013/0181535 A1* | 7/2013 | Muratov | H01F 27/363 307/104 |

(Continued)

FOREIGN PATENT DOCUMENTS

| | | |
|---|---|---|
| CN | 103051068 A | 4/2013 |
| CN | 104578449 A | 4/2015 |

(Continued)

*Primary Examiner* — Rexford N Barnie
*Assistant Examiner* — Rasem Mourad
(74) *Attorney, Agent, or Firm* — Birch, Stewart, Kolasch & Birch, LLP

(57) ABSTRACT

A wireless power transmission apparatus includes a shielding plate, a transmission coil on the shielding plate, and a shielding member disposed on the shielding plate and configured to surround the transmission coil. The shielding plate may shield a magnetic field formed to a lower side of the transmission coil. The shield member can offset the magnetic field formed on the side of the transmission coil. Thus, the embodiment can minimize EMI or EMF caused by the magnetic field formed on the lower side and the side of the transmission coil.

14 Claims, 20 Drawing Sheets

(56) References Cited

U.S. PATENT DOCUMENTS

| | | | |
|---|---|---|---|
| 2014/0029233 A1* | 1/2014 | Yanagida | H01Q 7/00 |
| | | | 361/818 |
| 2015/0115723 A1 | 4/2015 | Levo et al. | |
| 2015/0179333 A1* | 6/2015 | Jeong | H01F 27/363 |
| | | | 336/84 M |
| 2016/0072167 A1 | 3/2016 | Kawai et al. | |
| 2016/0374154 A1* | 12/2016 | Viroli | H02J 50/70 |
| 2017/0178800 A1 | 6/2017 | Muratov | |
| 2017/0288460 A1* | 10/2017 | Yao | H02J 50/12 |
| 2018/0166928 A1* | 6/2018 | Wu | H01F 38/14 |
| 2019/0229556 A1 | 7/2019 | Choi et al. | |
| 2020/0083756 A1* | 3/2020 | Ahn | H02J 50/12 |

FOREIGN PATENT DOCUMENTS

| | | | |
|---|---|---|---|
| CN | 105190992 A | | 12/2015 |
| CN | 106899094 A | | 6/2017 |
| EP | 3 487 036 A1 | | 5/2019 |
| KR | 10-2013-0028447 A | | 3/2013 |
| KR | 10-2013-0039273 A | | 4/2013 |
| KR | 10-2016-0090420 A | | 8/2016 |
| KR | 10-2017-0088184 A | | 8/2017 |
| KR | 20170088184 A | * | 8/2017 |
| KR | 10-1853491 B1 | | 4/2018 |
| KR | 10-2004445 B1 | | 7/2019 |
| WO | WO 2018/138130 A1 | | 8/2018 |

* cited by examiner (a) (b)

(c) (d)

(a)

(b)

(c)

WIRELESS POWER TRANSMISSION APPARATUS

CROSS REFERENCE TO RELATED APPLICATIONS

This application is the National Phase of PCT International Application No. PCT/KR2020/009486, filed on Jul. 17, 2020, all of which is hereby expressly incorporated by reference into the present application.

FIELD

The embodiment relates to a wireless power transmission apparatus.

BACKGROUND ART

Recently, a wireless power transmission capable of wirelessly transmitting power has attracted attention.

Wireless power transmission or wireless energy transfer is a technology for wirelessly transmitting electrical energy from a transmitter to a receiver using the induction principle of a magnetic field.

Wireless power transmission can be used in various industries such as IT, railways, automobiles, display devices such as TVs, and home appliances as well as mobile.

Meanwhile, transmission power tends to increase in line with the recent trend of fast charging of smart phone wireless chargers for home use or vehicles. In addition, research/development/standardization of wireless charging for relatively high-powered mobile devices such as tablet PCs and note PCs is actively under way. While this increase in transmission power provides the convenience of rapid charging to users, there is a problem in that, due to leakage magnetic fields, the influence of electromagnetic interference (EMI) to other devices and electromagnetic waves human exposure (EMF) increases.

SUMMARY

An object of embodiments is to solve the foregoing and other problems.

Another object of the embodiments is to provide a wireless power transmission apparatus that minimizes EMI.

Another object of the embodiments is to provide a wireless power transmission apparatus that minimizes EMF.

Another object of the embodiments is to provide a wireless power transmission apparatus capable of reducing the component size of a resonance capacitor.

Technical Solution

According to one aspect of the embodiment to achieve the above or other object, a wireless power transmission apparatus includes a shielding plate; a transmission coil on the shielding plate; and a shielding member disposed on the shielding plate and configured to surround the transmission coil.

Advantageous Effect

Effects of the wireless power transmission apparatus according to the embodiments are described as follows.

According to at least one of the embodiments, the shielding plate is disposed on the lower side of the transmission coil and the shielding member is disposed on the side of the transmission coil. Thus, the magnetic field formed at the rear of the transmission coil is shielded by the shielding plate and the magnetic field formed on the side of the transmission coil is offset by the shielding member, thereby minimizing EMI or EMF caused by the magnetic field of the transmission coil.

According to at least one of the embodiments, a shielding layer is disposed around the transmission coil, and when a magnetic field is generated in the transmission coil, the phase of the current flowing in the transmission coil is reversed by the magnetic field generated in the transmission coil in the shielding layer and a current having the same amplitude flows, and a magnetic field formed on the side of the transmission coil is offset by a magnetic field generated by the current, thereby minimizing EMI or EMF on the side of the transmission coil.

According to at least one of the embodiments, the capacitance value of the resonance capacitor can be reduced by increasing the total inductance value due to the at least one pattern coil by making at least one pattern coils constituting the shielding layer, thereby reducing the component size of the resonance capacitor, increasing transmission efficiency, and improving shielding performance.

According to at least one of the embodiments, a closed loop opening is formed in the base substrate so that when the base substrate is placed on the shielding plate, the transmission coil is easily guided to the closed loop opening, thereby being disposed on the shielding plate without obstructing the transmission coil.

A further scope of applicability of the embodiments will become apparent from the detailed description that follows. However, since various changes and modifications within the spirit and scope of the embodiments can be clearly understood by those skilled in the art, it should be understood that the detailed description and specific embodiments, such as preferred embodiments, are given by way of example only.

DETAILED DESCRIPTION OF THE EMBODIMENTS

Figure 1:
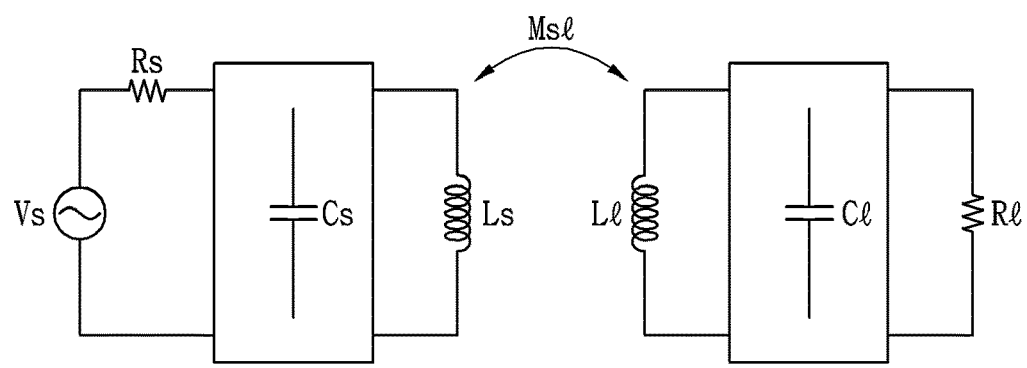
FIG. 1 is a magnetic induction type equivalent circuit.

Hereinafter, preferred embodiments of the present disclosure will be described in detail with reference to the accompanying drawings. However, the technical idea of the present disclosure is not limited to some of the described embodiments, but may be implemented in a variety of different forms, and if it is within the scope of the technical idea of the present disclosure, one or more of the components among the embodiments can be used by selectively combining and substituting. In addition, terms (including technical and scientific terms) used in the embodiments of the present disclosure may be interpreted in a meaning that can be generally understood by those of ordinary skill in the art to which the present disclosure belongs, unless explicitly specifically defined and described, and commonly used terms, such as terms defined in a dictionary, can be interpreted in consideration of contextual meanings of related technologies. Also, terms used in the embodiments of the present disclosure are for describing the embodiments and are not intended to limit the present disclosure. In this specification, the singular form may also include the plural form unless otherwise specified in the phrase, and when described as "at least one (or one or more) of B and C", it can include one or more of any combination that may be combined with A, B, and C. In addition, terms such as first, second, A, B, (a), and (b) may be used to describe components of an embodiment of the present disclosure. These terms are only used to distinguish the component from other components, and the term is not limited to the nature, order, or sequence of the corresponding component. In addition, when a component is described as being 'connected', 'coupled' or 'joined' to the other component, it may include a case where the component is not only directly 'connected', 'combined', or 'joined' to the other component, but also a case where a component is 'connected', 'combined', or 'joined' to the other component through another component. In addition, when it is described as being formed or disposed on the "top (upper) or bottom (lower)" of each component, it may include a case where two components are not only in direct contact with each other, but also a case where another component is formed or disposed between two components. In addition, when expressed as "up (up) or down (down)", it may include the meaning of not only the upward direction but also the downward direction based on one component.

Hereinafter, a wireless power transmission system including a wireless power transmission apparatus having a function of wirelessly transmitting power according to an embodiment of the present disclosure and an electronic device wirelessly receiving power will be described in detail with reference to the drawings. For example, a wireless power reception apparatus that wirelessly receives power from an electronic device may be included, but is not limited thereto. The embodiments introduced below are provided as examples to sufficiently convey the spirit of the present disclosure to those skilled in the art. Accordingly, the present disclosure may be embodied in other forms without being limited to the embodiments described below. In addition, in the drawings, the size and thickness of the apparatus may be exaggerated for convenience. Like reference numbers indicate like elements throughout the specification.

A wireless power transmission apparatus according to an embodiment may be configured in a pad type, a cradle type, an access point (AP) type, or the like.

A wireless power reception apparatus according to an embodiment may be used in small electronic devices such as wearable devices includes a mobile phone, a smart phone, a laptop computer, a digital broadcasting terminal, a personal digital assistant (PDA), a portable multimedia player (PMP), a navigation device, and an MP3 players, electric toothbrushes, electronic tags, lighting devices, remote controls, fish floats, and smart watches, but are not limited thereto, and the present disclosure can be used in a device capable of charging a battery equipped with a wireless power reception apparatus according to an embodiment.

Embodiments may consider a system capable of transmitting power to one or more electronic devices using a wireless power transmission apparatus including one or a plurality of transmission coils.

Terms used in the embodiments are as follows.

Wireless Power Transmission System: A system that provides wireless power transmission within a magnetic field.

Wireless Power Transmission apparatus: A device that provides wireless power transmission to electronic devices within a magnetic field and manages the entire system.

Wireless Power Reception Apparatus: A device that receives wireless power transmission from a wireless power transmission apparatus within a magnetic field.

Charging area: As an area where actual wireless power transmission takes place within the magnetic field area, and the area may vary depending on the size, required power, and operating frequency of applications such as electronic devices.

Looking at the principle of wireless power transmission, there are largely a magnetic induction method and a magnetic resonance method as wireless power transmission principles.

The magnetic induction method is a non-contact energy transmission technology in which an electromotive force is generated in the load inductor through magnetic flux generated when a transmission inductor and a load inductor are brought close to each other and a current is passed through one transmission inductor. The magnetic resonance method is a skill that combines two resonators, and magnetic resonance occurs by the natural frequency between the two resonators, vibrating at the same frequency and generating electric and magnetic fields in the same wavelength range.

FIG. 1 is a magnetic induction type equivalent circuit.

Referring to FIG. 1, in a magnetic induction type equivalent circuit, a wireless power transmission apparatus can be implemented with a source voltage Vs according to a device supplying a power, a transmission resistance Rs, and a transmission capacitor Cs for impedance matching, and a transmission coil Ls for magnetic coupling with a wireless power reception apparatus, and the wireless power reception apparatus can be implemented with a load resistance Rl, which is an equivalent resistance of the wireless power reception apparatus, a load capacitor Cl for impedance matching, and a load coil Ll for magnetic coupling with the wireless power reception apparatus, and the degree of magnetic coupling between the transmission coil Ls and the load coil Ll can be expressed as a mutual inductance Msl.

A transmission capacitor Cs may be added to the wireless power transmission apparatus as a compensation capacitor for impedance matching, and a load capacitor Cl may be added to the wireless power reception apparatus. The compensation capacitors Cs and Cl may be connected to, for example, the reception coil Ls and the load coil Ll, respectively. In addition, passive elements such as additional capacitors and inductors as well as compensation capacitors may be further added to each of the wireless power transmission apparatus and wireless power reception apparatus for impedance matching.

Figure 2:
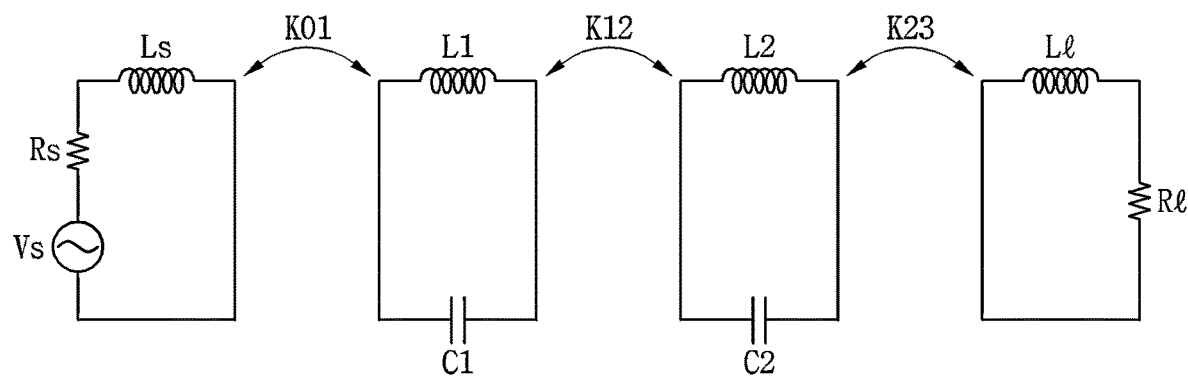
FIG. 2 is a magnetic resonance type equivalent circuit.

FIG. 2 is a magnetic resonance type equivalent circuit.

Referring to FIG. 2, in the magnetic resonance type equivalent circuit, the wireless power transmission apparatus is implemented with a source coil constituting a closed circuit by a series connection of a source voltage Vs, a transmission resistance Rs, and a transmission inductor Ls, and as a resonant coil constituting a closed circuit by a series connection of resonant inductor L1 and a resonance capacitor C1, the wireless power reception apparatus is implemented with a load coil constituting a closed circuit by a series connection of a load resistance Rl and a load inductor Ll, and a resonant coil constituting a closed circuit by a series connection of a load coil, a resonant inductor L2, and a resonance capacitor C2, and the transmission inductor Ls and inductor L1 are magnetically coupled with the coupling coefficient of K01, the load inductor Ll and the load-side resonant inductor L2 are magnetically coupled with a coupling coefficient of K23, and the resonant inductor L1 and the resonant inductor L2 are magnetically coupled with a coupling coefficient of L12. In the equivalent circuit of another embodiment, the source coil and/or the load coil may be omitted and only the resonant coil and the resonant coil may be formed.

In the magnetic resonance method, when the resonant frequencies of the two resonators are the same, most of the energy of the resonator of the wireless power transmission apparatus is transferred to the resonator of the wireless power reception apparatus, so that power transfer efficiency can be improved.

In order to increase efficiency in the self-resonant method, an impedance matching element may be added, and the impedance matching element may be a passive element such as an inductor and a capacitor.

Based on the wireless power transmission principle, a wireless power transmission system for transmitting power in a magnetic induction method or a magnetic resonance method will be described.

<Wireless Power Transmission Apparatus>

Figure 3A:
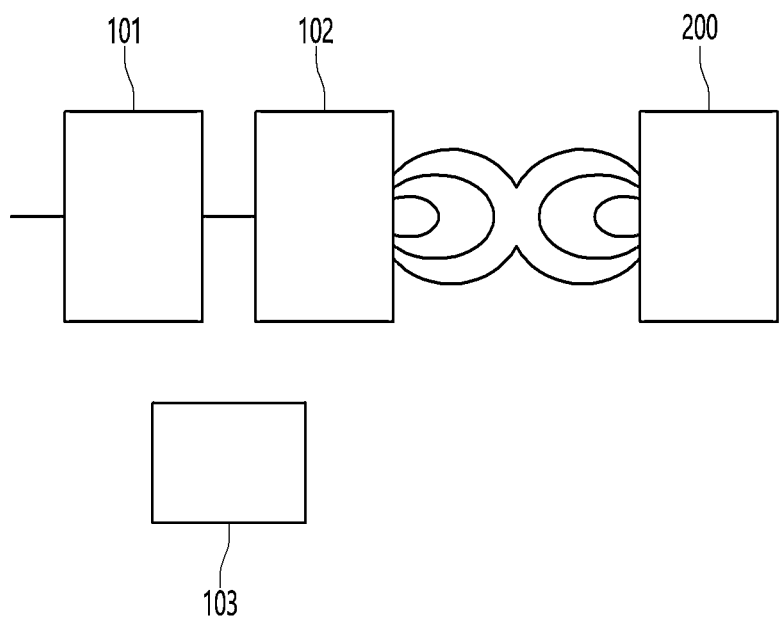
FIGS. 3A and 3B are block diagrams illustrating a wireless power transmission apparatus as one of wireless power transmission systems.
Figure 3B:
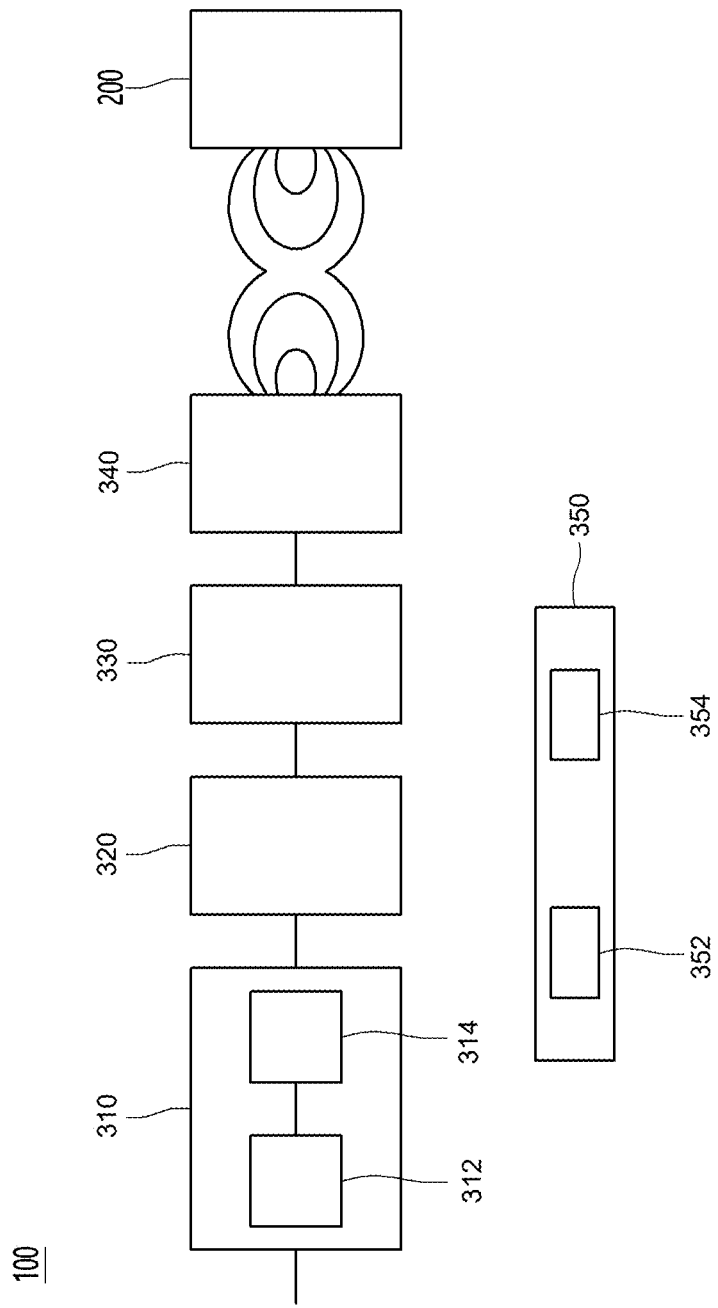

FIGS. 3A and 3B are block diagrams illustrating a wireless power transmission apparatus as one of wireless power transmission systems.

Referring to FIG. 3A, the wireless power transmission system according to an embodiment may include a wireless power transmission apparatus 100 and a wireless power reception apparatus 200 that wirelessly receives power from the wireless power transmission apparatus 100. For example, the wireless power reception apparatus 200 may include a wireless power reception apparatus that receives power wirelessly, but is not limited thereto.

The wireless power transmission apparatus 100 may include a power converter 101 which performs power conversion of the input AC signal to output as the AC signal, a resonance circuit portion 102 which generates a magnetic field based on the AC signal output from the power converter 101 to provide a power to the wireless power reception apparatus 200 within the charging area, and a controller 103 configured to control the power conversion of the power converter 101, adjust the amplitude and frequency of the output signal of the power converter 101, perform impedance matching of the resonance circuit portion 102, senses impedance, voltage, and current information from the power converter 101 and the resonance circuit portion 102, and wirelessly communicate with the wireless power reception apparatus 200.

The power converter 101 may include at least one of a power converter that converts an AC signal into a DC signal, a power converter that outputs DC by varying the level of DC, and a power converter that converts DC into AC. The resonant circuit portion 102 may include a coil and an impedance matching portion capable of resonating with the coil. In addition, the controller 103 may include a sensing portion for sensing impedance, voltage, and current information and a wireless communication portion. For example, the sensing portion may include a current measurement portion that measures current, but is not limited thereto. For example, the communication portion may be able to communicate in a Bluetooth manner. For example, the communication portion may be able to communicate in an in-band communication method or an out-of-band communication method.

Specifically, referring to FIG. 3B, the wireless power transmission apparatus 100 may include an AC/DC converter 310, a DC/AC converter 320, an impedance matching portion 330, a transmission coil portion 340, and a communication and control portion 350.

The AC/DC converter 310 is a power converter that converts an AC signal provided from the outside into a DC signal under the control of the communication and control portion 350 and a DC/DC converter 314.

A rectifier 312 is a system that converts a supplied AC signal into a DC signal, and as an embodiment for implementing this and may be a diode rectifier having a relatively high efficiency during high frequency operation, a synchronous rectifier that can be one-chip, or a hybrid rectifier that can save a cost and space and has a high degree of freedom in dead time. However, it is not limited thereto, and any system that converts alternating current to direct current can be applied.

In addition, the DC/DC converter 314 adjusts the level of the DC signal provided from the rectifier 312 under the control of the communication and control portion 350, and, as an example of implementing this, may be a buck converter that lowers the level of the input signal, a boost converter that increases the level of an input signal, a buck boost converter that can lower or increase the level of an input signal, or a cuk converter. In addition, the DC/DC converter 314 may include a switch element for power conversion control, an inductor and capacitor for power conversion mediation or output voltage smoothing, and a transformer for adjusting voltage gain or electrical separation (isolation) and the like, and may function to remove a ripple component or a pulsation component (AC component included in a DC signal) included in an input DC signal. An error between the command value of the output signal of the DC/DC converter 314 and the actual output value may be adjusted through a feedback method, and this may be performed by the communication and control portion 350.

The DC/AC converter 320 is a system capable of converting the DC signal output from the AC/DC converter 310 into an AC signal under the control of the communication and control portion 350 and adjusting the frequency of the converted AC signal, and, as an example of implementing this, there is a half bridge inverter or a full bridge inverter. As the wireless power transmission system, various amplifiers that convert direct current to alternating current may be applied, and, as an example, there are class A, class B, class AB, class C, class E, and class F amplifiers. In addition, the DC/AC converter 320 may include an oscillator that generates a frequency of the output signal and a power amplifier that amplifies the output signal.

The impedance matching portion 330 improves signal flow by minimizing reflected waves at points having different impedances. Since the two coils of the wireless power transmission apparatus 100 and the wireless power reception apparatus 200 are spatially separated and there is a lot of magnetic field leakage, it is possible to improve power transfer efficiency by correcting the difference in impedance between the two connection ends of the wireless power transmission apparatus 100 and the wireless power reception apparatus 200. The impedance matching portion 330 may be composed of an inductor and a capacitor resistance element, and may adjust an impedance value for impedance matching by varying the resistance values of the inductance of the inductor and the capacitance resistance of the capacitor under the control of the communication and control portion 350.

When the wireless power transmission system transmits power in a magnetic induction method, the impedance matching portion 330 may have a series resonance structure or a parallel resonance structure, and energy loss can be minimized by increasing the inductive coupling coefficient between the wireless power transmission apparatus 100 and the wireless power reception apparatus 200.

When the wireless power transmission system transmits power in a magnetic resonance manner, the impedance matching portion 330 may change a separation distance between the wireless power transmission apparatus 100 and the wireless power reception apparatus 200 or it is possible to enable real-time correction of impedance matching according to the change in matching impedance on the energy transmission line due to the change in the characteristics of the coil according to the mutual influence by a metallic foreign object (FO) and, a number of devices, and the correction method thereof may be a multi-matching method using a capacitor, a matching method using multi-antennas, a method using a multi-loop, and the like.

The coil 340 may be implemented as a plurality of coils or a single coil, and when the plurality of coils 340 are provided, the coils may be spaced apart from each other or overlap with each other, and when the coils overlap with each other, the overlapping area can be determined in consideration of the variation in magnetic flux density. In addition, when the coil 340 is manufactured, the coil can be manufactured in consideration of internal resistance and radiation resistance, and at this time, if the resistance component is small, the quality factor can be increased and the transmission efficiency can be increased.

The communication and control portion 350 may include a controller 352 and a communication portion 354. The controller 352 may play a role of adjusting the output voltage of the AC/DC converter 310 in consideration of the power requirement, the current charging amount, and the wireless power method of the wireless power reception apparatus 200. Power to be transmitted may be controlled by generating frequencies and switching waveforms for driving the DC/AC converter 320 in consideration of maximum power transmission efficiency. In addition, the controller 352 may determine the size of the wireless power reception apparatus based on the unique information (RXID) received from the wireless power reception apparatus. In other words, one of a plurality of transmission coils may be selected according to the size of the wireless power reception apparatus. Unique information (RXID) may include RXID message, certification information (certification version), identification information, and error detection code (CRC), but is not limited thereto. The RXID message may include size and power information of the wireless power reception apparatus.

In addition, the overall operation of the wireless power reception apparatus 200 may be controlled using an algorithm, program, or application required for control read from a storage portion (not illustrated) of the wireless power reception apparatus 200. Meanwhile, the controller 352 may be referred to as a microprocessor, a microcontroller unit, or a microcomputer. The communication portion 354 may perform communication with a communication portion 264 (FIG. 4), and as an example of a communication method, a short-range communication method such as Bluetooth, NFC, or Zigbee may be used. The communication portion 354 and the communication portion 264 may transmit/receive charging status information, charging control commands with each other, and the like. The charging status information may include the number of wireless power reception apparatus 200, the remaining battery capacity, the number of times of charging, usage, battery capacity, the battery ratio, and the amount of transmission power of wireless power transmission apparatus 100. In addition, the communication portion 354 may transmit a charging function control signal for controlling the charging function of the wireless power reception apparatus 200, and the charging function control signal may be a control signal which controls the wireless power reception apparatus 200 to enable or disable the charging function.

As such, the communication portion 354 may communicate in an out-of-band format composed of a separate module, but is not limited thereto, and communication may be performed in an in-band format using a feedback signal transmitted from the wireless power reception apparatus to the wireless power transmission apparatus by using a power signal transmitted by the wireless power transmission apparatus. For example, the wireless power reception apparatus may modulate the feedback signal and transmit information such as charge start, charge end, battery status, or the like to the transmitter through the feedback signal. In addition, the communication portion 354 may be configured separately from the controller 352, and the wireless power reception apparatus 200 may also include the communication portion 264 in the controller 262 of the reception apparatus or may be configured separately.

<Wireless Power Reception Apparatus>

Figure 4:
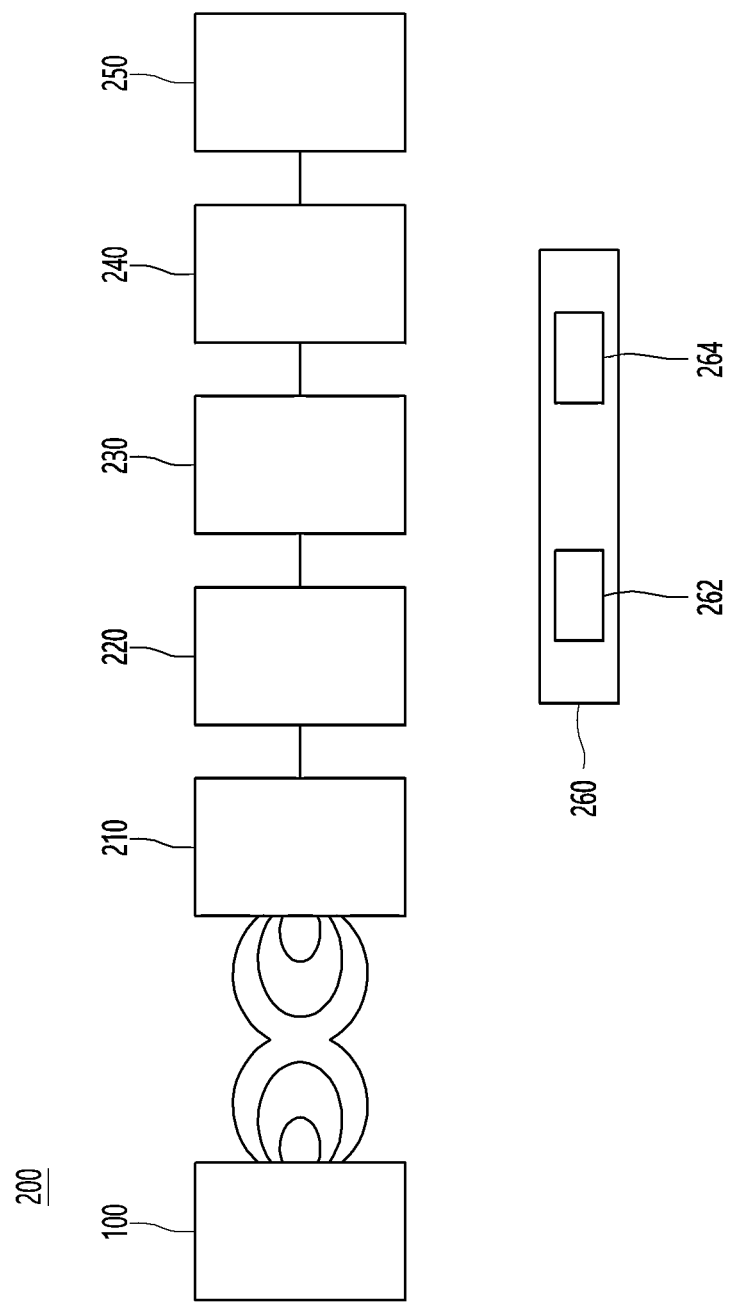
FIG. 4 is a block diagram illustrating an electronic device as one of wireless power transmission systems.

FIG. 4 is a block diagram illustrating an electronic device as one of wireless power transmission systems.

Referring to FIG. 4, the wireless power transmission system may include a wireless power transmission apparatus 100 and a wireless power reception apparatus 200 that wirelessly receives power from the wireless power transmission apparatus 100. The wireless power reception apparatus 200 may include a reception coil portion 210, an impedance matching portion 220, an AC/DC converter 230, a DC/DC converter 240, a load 250, and a communication and control portion 260.

The reception coil portion 210 may receive power through a magnetic induction method or a magnetic resonance method. As such, at least one of an induction coil and a resonant coil may be included according to a power receiving method. The reception coil portion 210 may also include an antenna for near field communication (NFC). The reception coil portion 210 may be the same as the coil portion 140, and the size of the receiving antenna may vary depending on the electrical characteristics of the wireless power reception apparatus 200.

The impedance matching portion 220 performs impedance matching between the wireless power transmission apparatus 100 and the wireless power reception apparatus 200.

The AC/DC converter 230 rectifies the AC signal output from the reception coil portion 210 to generate a DC signal.

The DC/DC converter 240 may adjust the level of the DC signal output from the AC/DC converter 230 according to the capacity of the load 250.

The load 250 may include a battery, a display, an audio output circuit, a main processor, and various sensors.

The communication and control portion 260 can be activated by wake-up power from the communication and control portion 350, communicate with the communication and control portion 350, and control the operation of subsystems of the wireless power reception apparatus 200.

A single or a plurality of wireless power reception apparatus 200 may be provided to simultaneously receive energy from the wireless power transmission apparatus 100 wirelessly. In other words, in a magnetic resonance type wireless power transmission system, a plurality of target wireless power reception apparatus 200 may receive power from one wireless power transmission apparatus 100. In this case, the matching portion 330 of the wireless power transmission apparatus 100 may adaptively perform impedance matching between the plurality of wireless power reception apparatus 200. This can be equally applied even when a plurality of independent coil portions are provided in the magnetic induction method.

In addition, when a plurality of wireless power reception apparatus 200 are configured, the power reception method may be the same system or different types of systems. In this case, the wireless power transmission apparatus 100 may be a system that transmits power in a magnetic induction method or a magnetic resonance method, or a system in which both methods are used together.

First Embodiment

Figure 5:
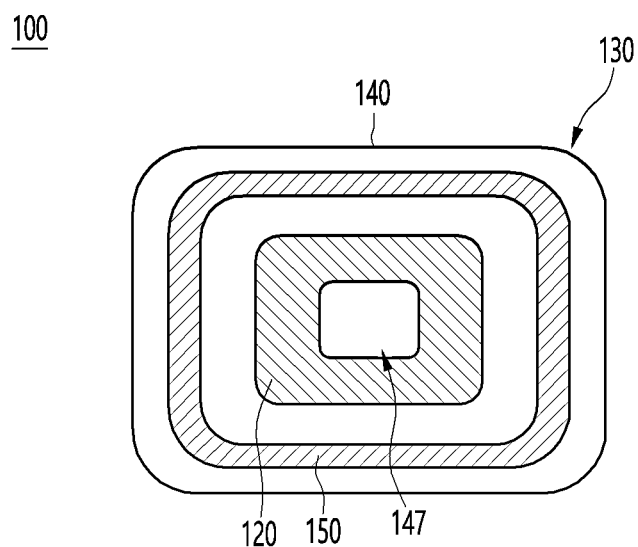
FIG. 5 is a plan view illustrating a wireless power transmission apparatus according to a first embodiment.
Figure 6:
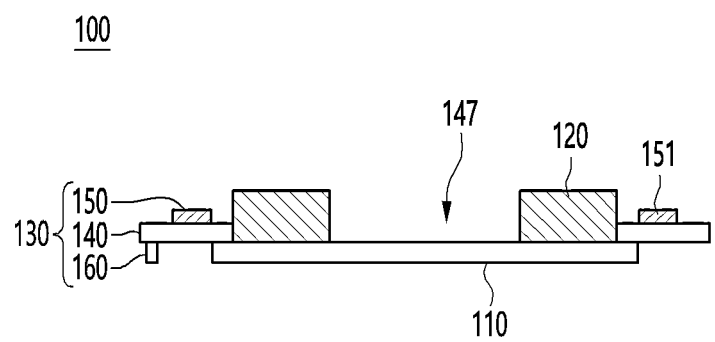
FIG. 6 is a cross-sectional view illustrating a wireless power transmission apparatus according to a first embodiment.
Figure 7:
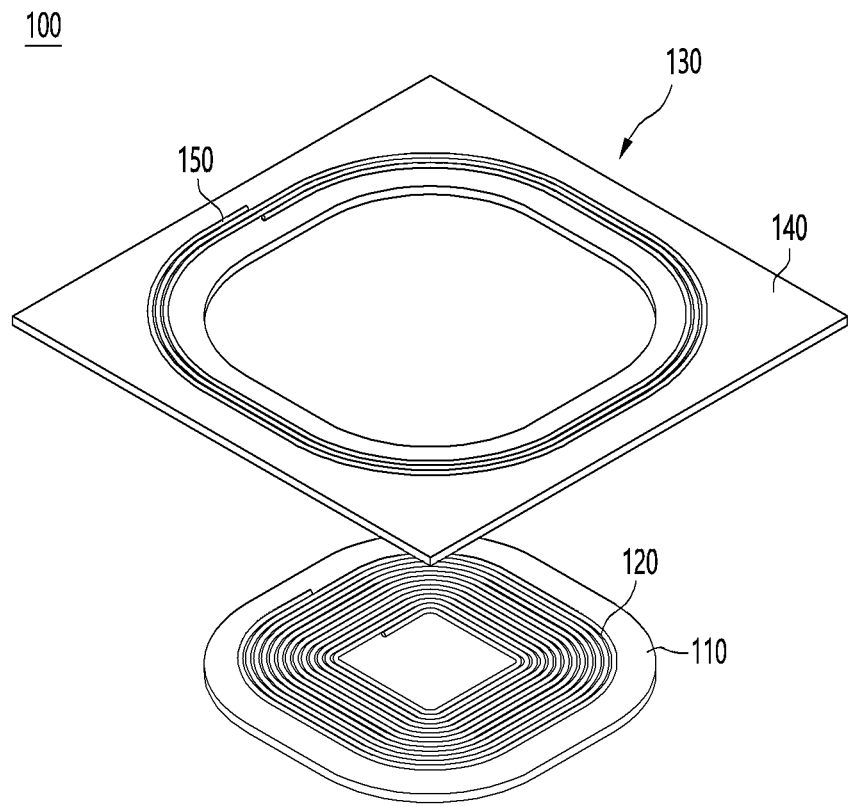
FIG. 7 is an exploded perspective view illustrating a wireless power transmission apparatus according to a first embodiment.

FIG. 5 is a plan view illustrating a wireless power transmission apparatus according to a first embodiment, FIG. 6 is a cross-sectional view illustrating a wireless power transmission apparatus according to a first embodiment, and FIG. 7 is an exploded perspective view illustrating a wireless power transmission apparatus according to a first embodiment.

Referring to FIGS. 5 to 7, the wireless power transmission apparatus 100 according to the first embodiment may include a shielding plate 110, a transmission coil 120, and a shielding member 130.

The shielding plate 110 may block the magnetic field generated by the transmission coil 120 from affecting the lower portion of the shielding plate 110.

The magnetic field generated by the current flowing through the transmission coil 120 may be distributed on the front, rear, and sides of the transmission coil 120.

In an embodiment, a wireless power reception apparatus may be positioned in front of the transmission coil 120 for charging.

Various electronic components for operating or controlling the wireless power transmission apparatus may be provided on the rear of the transmission coil 120. Accordingly, the shielding plate 110 can shield the magnetic field formed at the rear of the transmission coil 120 so that electronic components provided at the rear of the shielding plate 110 are not damaged by the magnetic field.

Meanwhile, people may be located around the side of the transmission coil 120. In this way, the magnetic field formed on the side of the transmission coil 120 can affect people. As will be described later, in the embodiment, a shielding member 130 is disposed on the side of the transmission coil 120 to offset or extinguish the magnetic field formed on the side of the transmission coil 120 by the shielding member 130 so that the magnetic field may not affect people.

For example, the size of the shielding plate 110 is larger than the size of the transmission coil 120, so that a magnetic field formed behind the transmission coil 120 can be completely shielded.

The shielding plate 110 may be made of a shielding material. For example, the shielding plate 110 may be made of a ferromagnetic material having high permeability such as ferrite, but is not limited thereto.

The transmission coil 120 may be disposed on the shielding plate 110. The transmission coil 120 may generate a magnetic field. The magnetic field generated in this way induces a current in the reception coil of the wireless power reception apparatus, and a received power may be generated based on the current.

A magnetic field may be generated by current flowing through the transmission coil 120. Current flows through the transmission 120 by transmission power, and a magnetic field can be generated by this current. As the transmission power increases, the current flowing through the transmission coil 120 increases, which may mean that the strength of the magnetic field increases.

In order to increase the received power generated by the wireless power reception apparatus, the strength of the magnetic field generated by the transmission coil 120 of the wireless power transmission apparatus 100 needs to increase or the coupling coefficient between the wireless power transmission apparatus 100 and the wireless power reception apparatus needs to increase. In order to increase the coupling coefficient, impedance matching may be performed between the wireless power transmission apparatus 100 and the wireless power reception apparatus, or the wireless power reception apparatus may be brought closer to the wireless power reception apparatus.

Meanwhile, the efficiency between the transmission power transmitted by the wireless power transmission apparatus 100 and the received power generated by the wireless power reception apparatus based on the transmission power may be referred to as transmission efficiency or charging efficiency. The higher the transmission efficiency, the higher the received power compared to the same transmission power.

The transmission coil 120 may be, for example, a Litz coil coated with an insulating material, but is not limited thereto. The transmission coil 120 may have a central hollow portion and may be wound multiple times along the circumference of the central hollow portion.

The transmission coil 120 may include one transmission coil or two or more transmission coils. For example, when three transmission coils are provided, two transmission coils may be disposed on a lower layer and the remaining one transmission coil may be disposed on an upper layer. In this case, the remaining one transmission coil may be disposed to partially overlap each of the two transmission coils. A plurality of transmission coils may be disposed along one direction, arranged in a matrix, or arranged in a honeycomb shape.

When viewed from above, the transmission coil 120 may have a circular shape, an elliptical shape, a square shape, a hexagon shape, and the like. For example, when the transmission coil 120 has a quadrangular shape, corners may be rectangular or rounded.

The transmission coil 120 may be attached to the shield member 130 using an adhesive material, but is not limited thereto.

The shielding member 130 may be disposed on the shielding plate 110.

The shielding member 130 may block the magnetic field generated by the transmission coil 120 from affecting the side.

The shielding member 130 may include a base substrate 140, a shielding layer 150 and a resonance capacitor 160.

The shielding member 130 may generate current capable of inverting the phase of the current flowing through the transmission coil 120. In other words, the shielding member 130 may generate a magnetic field to offset the magnetic field generated by the transmission coil 120. Here, the magnetic field generated by the transmission coil 120 may be a magnetic field flux. The magnetic field flux may form a closed loop from the outside of the transmission coil 120 to the lower side of the transmission coil 120 after penetrating from the lower side to the upper side of the transmission coil 120.

The magnetic field flux formed in front of the transmission coil 120 may be used to generate the received power of the wireless power reception apparatus. This will be explained in detail later.

The base substrate 140 may include an opening 147.

The base substrate 140 may support or protect the shielding layer 150 and the resonance capacitor 160. For example, the base substrate 140 may include a rigid base substrate or a flexible base substrate. For example, the base substrate 140 may be a printed circuit board made of FR-4. FR-4 is classified according to the resin type of the printed circuit board and may be made of, for example, epoxy resin.

FR-4 may be the NEMA rating designation for glass-reinforced epoxy laminate materials. FR-4 may be a composite material composed of a woven glass fiber cloth with an epoxy resin binder that is flame retardant (self-extinguishing).

FR-4 glass epoxies have excellent strength-to-weight ratios and can be a variety of high pressure thermoset plastic laminates. With little water absorption, FR-4 can be an electrical insulator with considerable mechanical strength. FR-4 can have high mechanical values and electrical insulating properties in dry and wet conditions.

The size of the base substrate 140 may be larger than the size of the shielding plate 110, but is not limited thereto.

The base substrate 140 and the transmission coil 120 may be disposed on the same surface. In other words, the base substrate 140 may also be disposed on the upper surface of the shielding plate 110, and the transmission coil 120 may also be disposed on the upper surface of the shielding plate 110. To this end, an opening 147 may be provided in the base substrate 140, and a transmission coil 120 may be disposed in the opening 140. The transmission coil 120 may be disposed on the shielding plate 110 through the opening 147 of the base substrate 140.

The opening 147 may be a hole penetrating the upper and lower surfaces of the base substrate 140. The opening 147 may be located at the center of the base substrate 140, but is not limited thereto.

The diameter of the opening 147 may be equal to or greater than the size of the transmission coil 120. Therefore, when the shielding member 130 is disposed on the shielding plate 110, the transmission coil 120 disposed on the shielding plate 110 can be disposed to protrude upward through the opening 147 without obstruction of the base substrate 140. In other words, an opening 147 may be formed in the base substrate 140 so that the shielding member 130 is easily disposed on the shielding plate 110.

Since the diameter of the opening 147 is smaller than the size of the shielding plate 110 and the size of the base substrate 140 is larger than the size of the shielding plate 110, when the base substrate 140 is disposed on the shielding plate 110, a portion of the lower surface of the base substrate 140 may be seated on the shielding plate 110. The base substrate 140 may be attached to the shielding plate 110 using an adhesive material, but is not limited thereto.

The resonance capacitor 160 may be mounted on the base substrate 140 and connected to the shielding layer 150. For example, the resonance capacitor 160 may be mounted on the lower surface of the base substrate 140, but is not limited thereto. At least one resonance capacitor 160 may be provided.

The resonance capacitor 160 may adjust the phase and amplitude of the current generated in the shielding layer 150. In other words, the phase of the current generated in the shielding layer 150 may change and the amplitude thereof may increase according to the value of the capacitance of the resonance capacitor 160. Accordingly, by the adjustment of the resonance capacitor 160, a current having a phase opposite to that of the current generated by the transmission coil 120 and having the same amplitude as that of the current may flow through the shielding layer 150. Accordingly, the transmission coil generated in the transmission coil 120 may be offset by the magnetic field generated in the shielding layer 150. Therefore, the magnetic field generated by the transmission coil 120 by the resonance capacitor 160 is offset, thereby minimizing or blocking EMI or EMF on the side.

When the magnetic field generated by the transmission coil 120 is sufficiently offset by the shielding layer 150 alone, the resonance capacitor 160 may be omitted.

The shielding layer 150 may be spaced apart from the outside of the transmission coil 120. The shielding layer 150 may have a shape corresponding to that of the transmission coil 120. For example, when the transmission coil 120 has a circular shape, the shielding layer 150 may also have a circular shape. In this way, since the shielding layer has a shape corresponding to the shape of the transmission coil 120, the shielding layer 150 can maintain the same distance as the transmission coil 120 along the circumference of the shielding layer 150, and thus a current can be easily induced in the shielding layer 150 by the magnetic field of the transmission coil 120.

The shielding layer 150 may be disposed on the base substrate 140, but is not limited thereto.

The shielding layer 150 may include pattern coils 151 patterned by a patterning process. For example, after a metal film is formed on the base substrate 140, an etching process may be performed to form the pattern coil 151 on the base substrate 140. Thus, the pattern coil 151 may include metal. For example, the pattern coil 151 may be made of copper, aluminum, platinum, or the like, but is not limited thereto.

The pattern coil 151 may be wound in plurality. Since the pattern coil 151 is metal, wound coils may be spaced apart from each other to prevent an electrical short.

Since the pattern coil 151 is formed by a patterning process, the pattern coil 151 can be freely formed into a desired shape.

The pattern coil 151 and the resonance capacitor 160 may form a closed loop. In other words, one side of the pattern coil 151 may be connected to one side of the resonance capacitor 160 and the other side of the pattern coil 151 may be connected to the other side of the resonance capacitor 160.

In an embodiment, when a wireless power reception apparatus is adjacent to the wireless power reception apparatus, when a current flows through the transmission coil 120 according to a transmission power determined in the wireless power reception apparatus, a magnetic field corresponding to the current may be generated. The generated magnetic field may be formed on the front, rear, and side of the transmission coil 120. In this case, the magnetic field formed in the rear of the transmission coil 120 is blocked by the shielding plate 110, and damage to electronic components disposed under the shielding plate 110 can be prevented. A current is induced in the reception coil of the wireless power reception apparatus by a magnetic field formed in front of the transmission coil 120 to generate a received power, and the generated received power can be charged in a battery or the like.

Meanwhile, a current flows through the shielding layer 150 by a magnetic field formed on the side of the transmission coil 120, and a magnetic field may be formed by the current. At this time, the phase and amplitude of the current flowing through the shielding layer 150 are adjusted by the resonance capacitor 160 connected to the shielding layer 150, and the magnetic field formed on the side of the transmission coil 120 by the magnetic field generated by the shielding layer 150 is offset. Thus, the magnetic field is no longer formed on the side of the transmission coil 120, and the EMI or EMF on the side of the transmission coil 120 is minimized or blocked, thereby preventing damage to an electronic component located on the side of the transmission coil 120 or to a human body.

Second Embodiment

Figure 8:
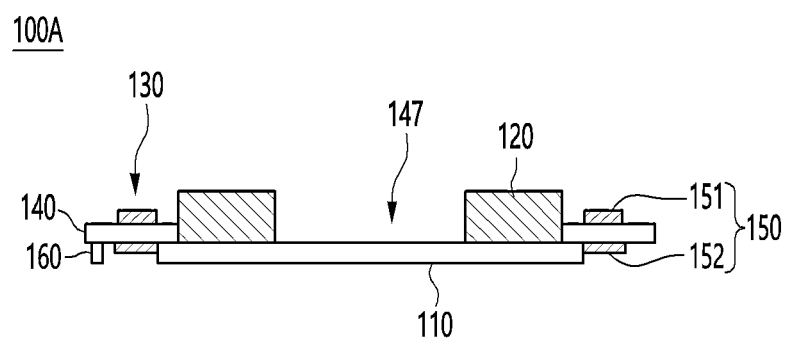
FIG. 8 is a cross-sectional view illustrating a wireless power transmission apparatus according to a second embodiment.
Figure 9:
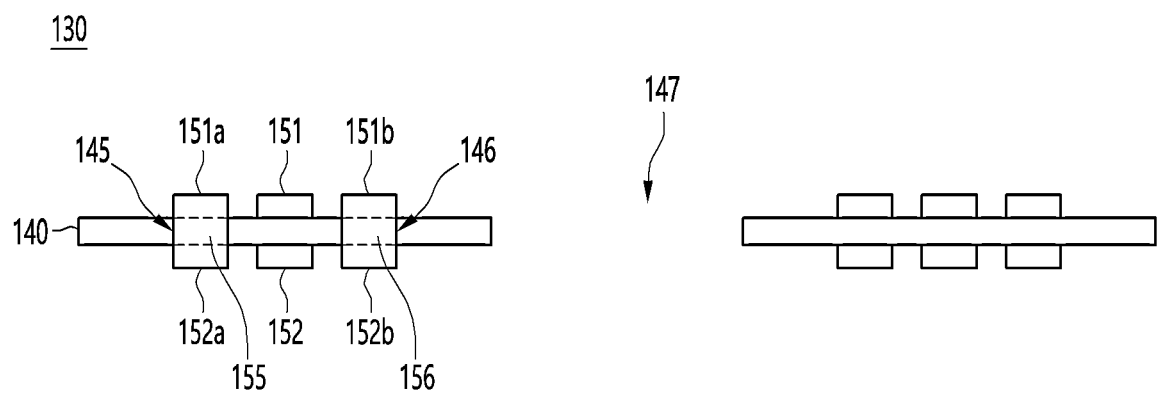
FIG. 9 is a cross-sectional view illustrating the shielding member of FIG. 8.

FIG. 8 is a cross-sectional view illustrating a wireless power transmission apparatus according to a second embodiment, and FIG. 9 is a cross-sectional view illustrating the shielding member of FIG. 8.

The second embodiment is similar to the first embodiment except for two layers of pattern coils 151 and 152. In the second embodiment, the same reference numerals are assigned to components having the same functions, shapes and/or structures as those in the first embodiment, and detailed descriptions are omitted.

Referring to FIGS. 8 and 9, the wireless power transmission apparatus 100A according to the second embodiment may include a shielding plate 110, a transmission coil 120 and a shielding member 130.

The shielding member 130 may include a base substrate 140, a shielding layer 150 and a resonance capacitor 160.

The base substrate 140 may include an opening 147 and vias 145 and 146. For example, the opening 147 may be located at the center of the base substrate 140. The vias 145 and 146 may be formed in a portion of an area where the shielding layer 150 is disposed at the edge of the base substrate 140.

In an embodiment, the shielding layer 150 may include two layers of pattern coils 151 and 152. For example, the first pattern coil 151 may be disposed on the upper surface of the base substrate 140 and the second pattern coil 152 may be disposed on the lower surface of the base substrate 140. In this case, the first pattern coil 151 and the second pattern coil 152 may be electrically connected through vias 145 and 146. Connection portions 155 and 156 may be disposed in the vias 145 and 146. For example, the connection portions 155 and 156 may be formed of the same material as the first pattern coil 151 and the second pattern coil 152, but are not limited thereto. For example, the connection portions 155 and 156 may be integrally formed with the first pattern coil 151 and the second pattern coil 152.

For example, the first connection portion 155 is disposed in the first via 151, and one side 151a of the first pattern coil 151 and one side 152a of the second pattern coil 152 can be electrically connected by the first connection portion 155. For example, the second connection portion 156 is disposed in the second via 152, and the other side 151b of the first pattern coil 151 and the other side 152b of the second pattern coil 152 can be electrically connected by the second connection portion 156.

FIG. 9 is a view which does not consider the resonance capacitor 160, and when the resonance capacitor 160 is considered, it may be illustrated differently from FIG. 9. In other words, when the resonance capacitor 160 is mounted on the lower surface of the base substrate 140, for example, the second connection portion 156 connected to the other side 151b of the first pattern coil 151 is connected to one side of the resonance capacitor 160, and the other side of the resonance capacitor 160 may be connected to one side 152a of the second pattern coil 152.

Alternatively, the resonance capacitor 160 may be disposed on the upper surface of the base substrate 140. In this case, for example, the second connection portion 156 connected to the other side 152b of the second pattern coil 152 may be connected to one side of the resonance capacitor 160, and the other side of the resonance capacitor 160 may be connected to one side 151a of the first pattern coil 151.

The first pattern coil 151 and the second pattern coil 152 may be disposed to overlap each other vertically with the base substrate 140 interposed therebetween. Specifically, each wound coil of the first pattern coil 151 and each wound coil of the second pattern coil 152 may be vertically overlapped to each other on a one-to-one basis with the base substrate 140 interposed therebetween.

If each of the first pattern coil 151 and the second pattern coil 152 is coated with an insulating material, the first pattern coil 151 and the second pattern coil 152 may also overlap each other on the same surface of the base substrate 140.

In the second embodiment, since the total inductance value is increased by the first pattern coil 151 and the second pattern coil 152 so that the capacitance value of the resonance capacitor 160 may be reduced compared to the first embodiment, the component size of the resonance capacitor 160 may be reduced, transmission efficiency may be increased, and shielding performance may be improved.

Third Embodiment

Figure 10:
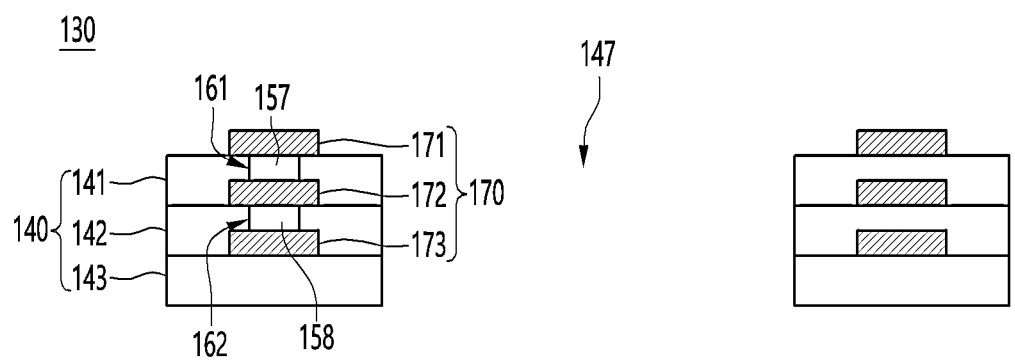
FIG. 10 is a cross-sectional view illustrating a shielding member in a wireless power transmission apparatus according to a third embodiment.

FIG. 10 is a cross-sectional view illustrating a shielding member in a wireless power transmission apparatus according to a third embodiment.

The third embodiment is similar to the first or second embodiment except for the pattern coils 171 to 173 having three or more layers. In the third embodiment, the same reference numerals are assigned to components having the same functions, shapes, and/or structures as those of the first or second embodiment, and detailed descriptions thereof are omitted.

Referring to FIGS. 5 and 10, the wireless power transmission apparatus according to the third embodiment may include a shielding plate 110, a transmission coil 120, and a shielding member 130.

The shielding member 130 may include a base substrate 140, a shielding layer 170, and a resonance capacitor 160.

The base substrate 140 may include an opening 147 and vias 161 and 162. For example, the opening 147 may be located at the center of the base substrate 140. The vias 161 and 162 may be formed in a portion of an area where the shielding layer 170 is disposed at the edge of the base substrate 140.

The base substrate 140 may include a first layer 141, a second layer 142, and a third layer 143. The second layer 142 may be disposed below the first layer 141, and the third layer 143 may be disposed below the second layer 142. In this case, the first via 161 may be formed in the first layer 141 and the second via 162 may be formed in the second layer 142.

The shielding layer 170 may be disposed on the base substrate 140. For example, the shielding layer 170 may include three or more layers of pattern coils 171 to 173.

In FIG. 10, for convenience of drawing, three layer pattern coils 171 to 173 are illustrated, but the embodiment may also include four or more layers of pattern coils.

For example, the first pattern coil 171 may be disposed on the upper surface of the first layer 141. A lower surface of the first pattern coil 171 may be connected to an upper surface of the first connection portion 157 disposed in the via 161 of the first layer 141.

For example, the second pattern coil 172 may be disposed between the first layer 141 and the second layer 142. For example, the second pattern coil 172 may be disposed on the upper surface of the second layer 142. The upper surface of the second pattern coil 172 is connected to the lower surface of the first connection portion 157, and the lower surface of the second pattern coil 172 is connected to the upper surface of the second connection portion 158 disposed in the via 162 of the second layer 142.

For example, the third pattern coil 173 may be disposed between the second layer 142 and the third layer 143. For example, the third pattern coil 173 may be disposed on the upper surface of the third layer 143. An upper surface of the third pattern coil 173 may be connected to a lower surface of the second connection portion 158.

In FIG. 10, although only one each of the first via 161 and the second via 162 is provided, two first vias and two second vias may be provided. For example, the first via 161 may include a 1-1 via and a 1-2 via, and the second via 162 may include a 2-1 via and a 2-2 via. In this case, one side of the first pattern coil 171 and one side of the second pattern coil 172 may be connected through the 1-1 via, and the other side of the first pattern coil 171, the other side of the second pattern coil 172 or one side of the first resonance capacitor (not illustrated) may be connected through the 1-2 via. One side of the second pattern coil 172 and one side of the third pattern coil 173 may be connected through the 2-1 via, and the other side of the second pattern coil 172 and the other side of the third pattern coil 173 or one side of the second resonance capacitor (not illustrated) may be connected through the 2-2 via.

The first to third pattern coils 171 to 173 may be made of the same metal, but are not limited thereto.

For example, the first layer 141 with the first pattern coil 171, the second layer 142 with the second pattern coil 172, and the third layer 143 with the third pattern coil 173 may be sequentially laminated, and then a thermal compression process may be performed to form the shielding layer 170 illustrated in FIG. 10, but the shielding layer 170 may be formed by various other processes. When the shielding layer 170 is formed by the thermal compression process, the boundary between the first layer 141, the second layer 142, and the third layer disappears, so that the first layer 141, the second layer 142, and the third layer 143 may be formed of one layer, but is not limited thereto.

In the third embodiment, since the total inductance value is increased by the three or more layers of pattern coils 171 to 173 so that the capacitance value of the resonance capacitor 160 may be reduced compared to the first or second embodiment, the component size of the resonance capacitor 160 may be reduced, transmission efficiency may be increased, and shielding performance may be improved.

Fourth Embodiment

Figure 11:
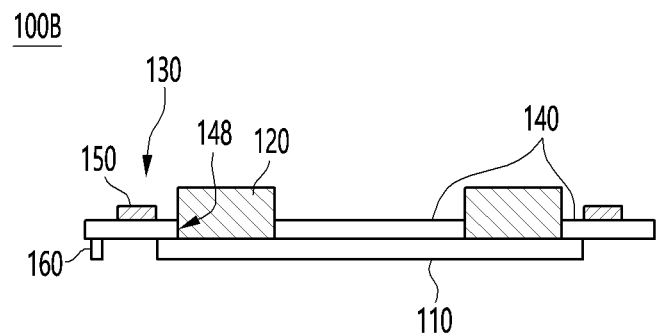
FIG. 11 is a cross-sectional view illustrating a wireless power transmission apparatus according to a fourth embodiment.
Figure 12:
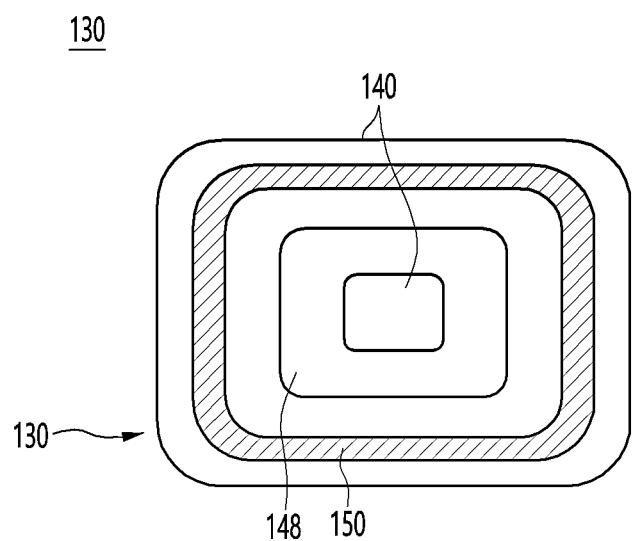
FIG. 12 is a plan view illustrating the shielding member of FIG. 11.

FIG. 11 is a cross-sectional view illustrating a wireless power transmission apparatus according to a fourth embodiment, and FIG. 12 is a plan view illustrating the shielding member of FIG. 11.

The fourth embodiment is similar to the first to third embodiments except for the base substrate 140 of the shielding member 130. In the fourth embodiment, the same reference numerals are given to components having the same functions, shapes and/or structures as those of the first to third embodiments, and detailed descriptions thereof are omitted.

Referring to FIGS. 11 and 12, the wireless power transmission apparatus 100B according to the fourth embodiment may include a shielding plate 110, a transmission coil 120, and a shielding member 130.

The shielding member 130 may include a base substrate 140, a shielding layer 150, and a resonance capacitor 160.

The base substrate 140 may include, for example, a closed loop opening 148. The closed loop opening 148 may have a shape corresponding to a size of a plurality of wound coils of the transmission coil 120, for example. The width of the closed loop opening 148 may be equal to or greater than the width of the plurality of wound coils of the transmission coil 120.

The transmission coil 120 may include a coil having a hollow portion at the center and wound a plurality of times along the circumference of the hollow portion. In this case, since the closed loop opening 148 has a shape corresponding to the plurality of wound coils, when the base substrate 140 is disposed on the shielding plate 110, the transmission coil 120 disposed on the shielding plate 110 may protrude through the closed loop opening 148 of the base substrate 140.

Accordingly, when the base substrate 140 is disposed on the shielding plate 110, a portion of the base substrate 140 may be disposed in the hollow portion of the transmission coil 120.

According to the fourth embodiment, the closed loop opening 148 is formed in the base substrate 140. Thus, when the base substrate 140 is placed on the shielding plate 110, the transmission coil 120 is guided to the closed loop opening 148 and thus the base substrate 140 can be placed on the shielding plate 110 without obstruction of the transmission coil 120.

Verification of Technical Effects of Embodiments

Figure 13:
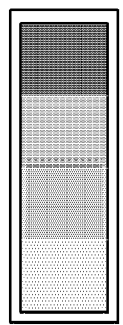
FIG. 13 illustrates a magnetic field distribution according to the capacitance of a resonance capacitor when the shielding layer is composed of one layer of pattern coil.
Figure 13:
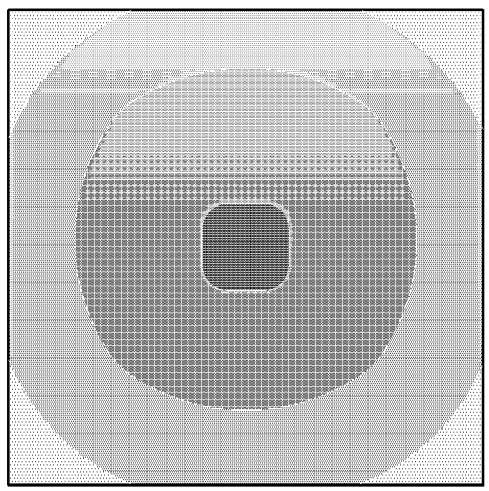
Figure 13:
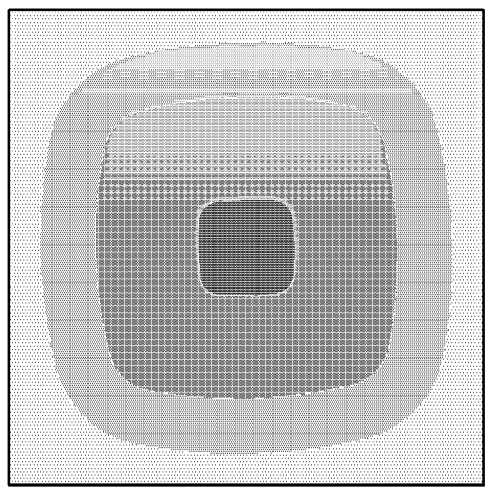
Figure 13:
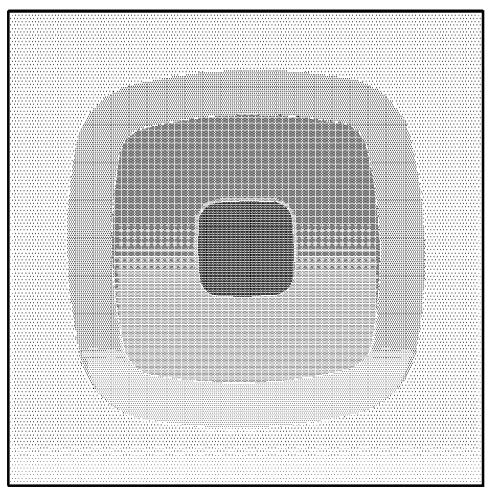
Figure 13:
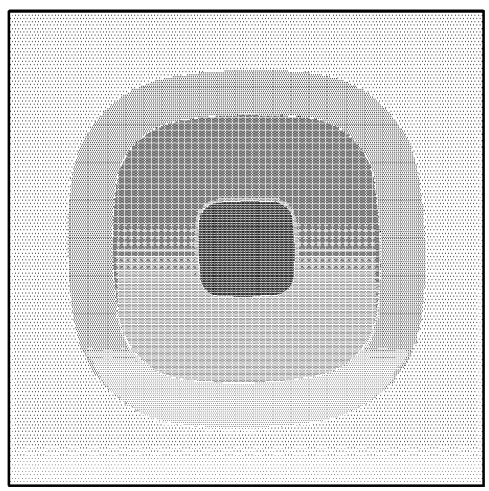
Figure 14:
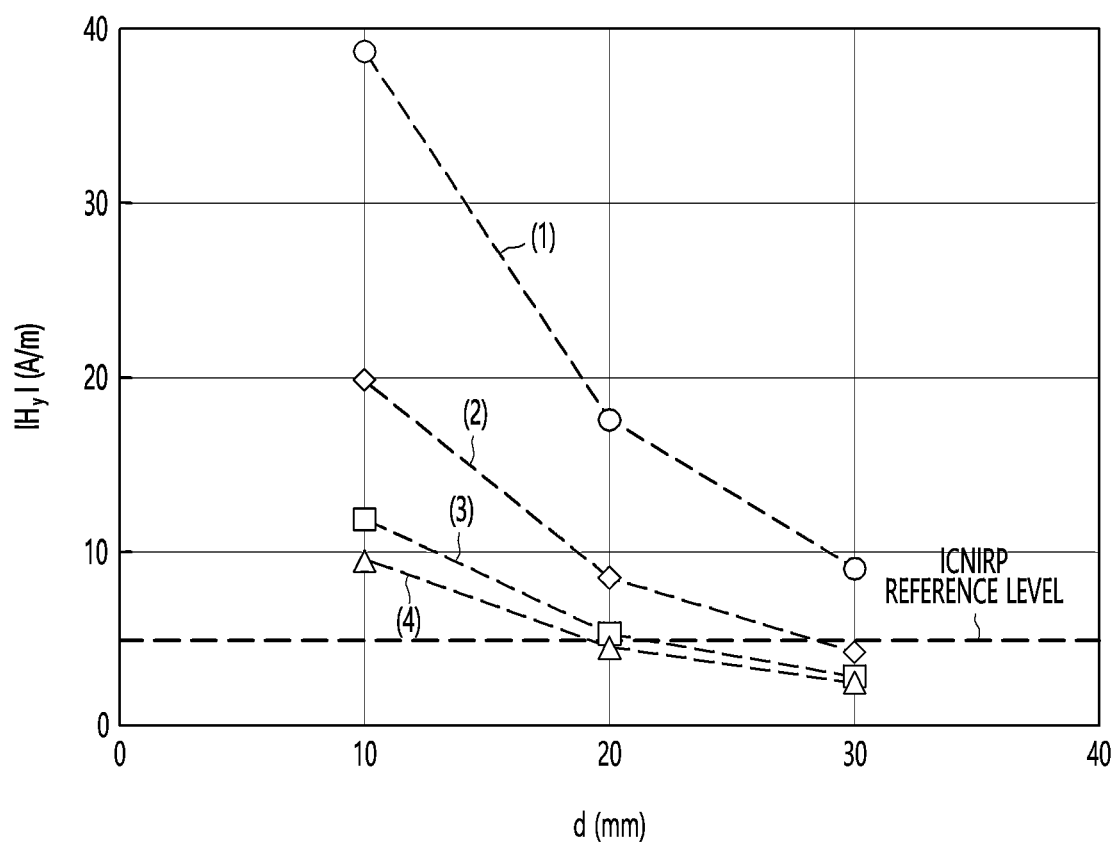
FIG. 14 illustrates a leakage magnetic field according to the capacitance of a resonance capacitor when the shielding layer is composed of one layer of pattern coil.
Figure 15:
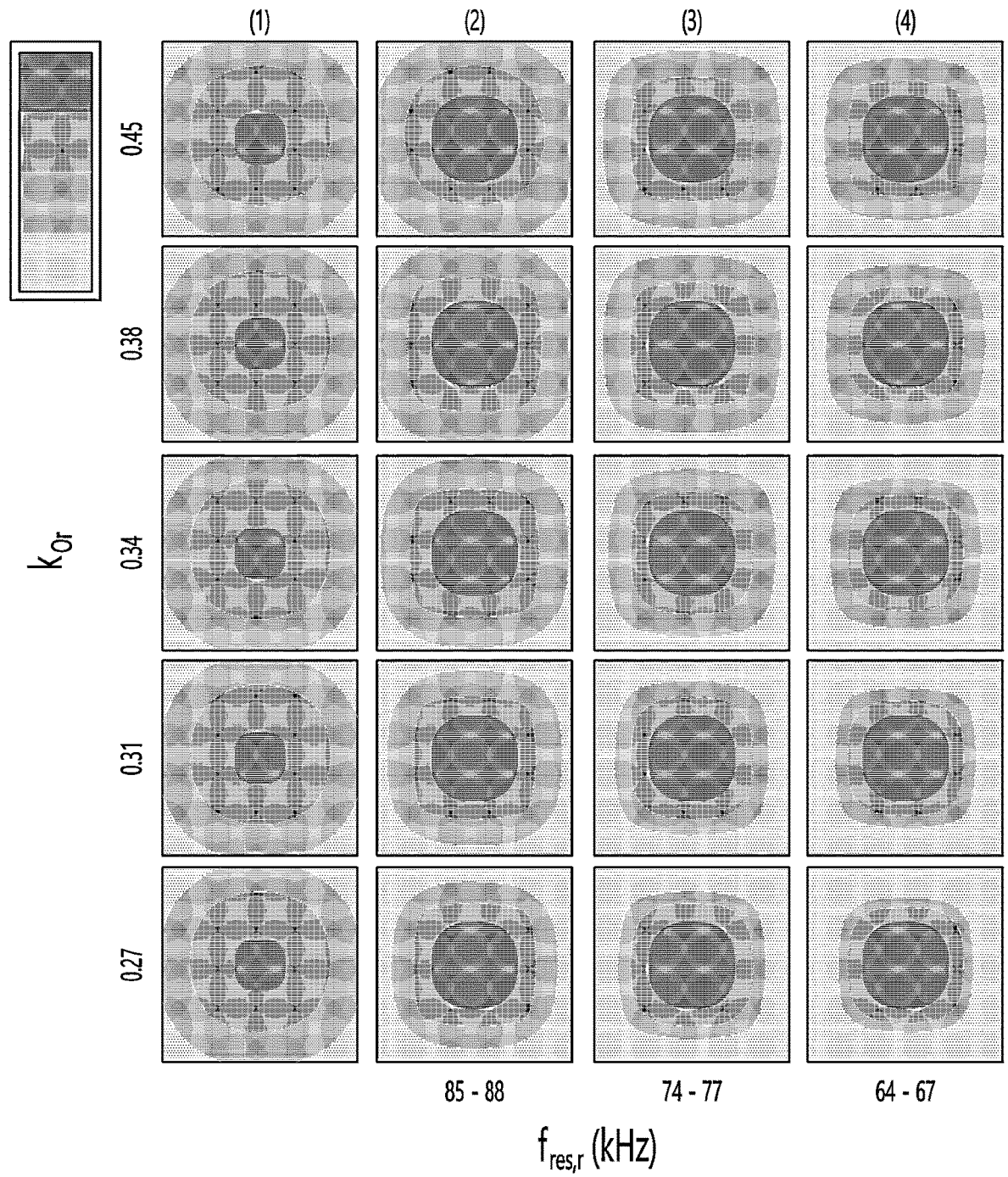
FIG. 15 illustrates a magnetic field distribution according to a relationship between a capacitance of a resonance capacitor, a resonance frequency, and a coupling coefficient when the shielding layer is composed of one layer of pattern coil.

FIG. 13 illustrates a magnetic field distribution according to the capacitance of a resonance capacitor when the shielding layer is composed of one layer of pattern coil, FIG. 14 illustrates a leakage magnetic field according to the capacitance of a resonance capacitor when the shielding layer is composed of one layer of pattern coil, and FIG. 15 illustrates a magnetic field distribution according to a relationship between a capacitance of a resonance capacitor, a resonance frequency, and a coupling coefficient when the shielding layer is composed of one layer of pattern coil.

FIGS. 13 to 15 are test results for a case where the shielding layer includes one layer of pattern coil in the first embodiment (FIGS. 5 to 7).

It can be seen that, compared to the prior art (FIG. 13A), as in the first embodiment (FIGS. 13B, 13c, and 13d), a shielding layer including one layer of pattern coil is provided, and as the resonance capacitor increases, the strength of the magnetic field decreases. For example, when a 2,300 nF resonance capacitor is used (FIG. 13B), the strength of the magnetic field may be reduced compared to the conventional one (FIG. 13A). When a 3,000 nF resonance capacitor is used (FIG. 13c), the strength of the magnetic field may be lower than when a 2,300 nF resonance capacitor is used (FIG. 13B). In addition, when a 4,000 nF resonance capacitor is used (FIG. 13d), the strength of the magnetic field may be lower than when a 3,000 nF resonance capacitor is used (FIG. 13c).

In FIG. 14, the conventional case (FIG. 13A) may be (1), the case where a 2,300 nF resonance capacitor is used (FIG. 13B) may be (2), and the case where a 3,000 nF resonance capacitor may be used (FIG. 13c) is (3), and the case where a 4,000 nF resonance capacitor is used (FIG. 13d) may be (4).

The dotted line is the ICNIRP reference level, and the leakage magnetic field is required to be managed below this reference level.

Overall, (1) has a much larger leakage magnetic field than (2), (3) and (4). Therefore, when the capacitor values of the resonance capacitors are different according to the first embodiment, it can be seen that the leakage magnetic field is significantly lower than that of the conventional case (1). Here, the leakage magnetic field may be a magnetic field on the side of the transmission coil.

In particular, in the conventional case (1), commercialization is difficult because it exceeds the ICNIRP standard level, but since, in the case of the first embodiment (3), (4), it can be managed at the ICNIRP standard level or less at a distance of 20 mm or more from the transmission coil, and then commercialization is possible.

In FIG. 15, the conventional case (1) and the first embodiment (2), (3), (4) are illustrated along the horizontal direction from the upper side, and the resonance frequency (fres, r) of the shielding layer is illustrated along the horizontal direction from the lower side, and the coupling coefficient k0r between the transmission coil and the shielding layer is illustrated along the longitudinal direction on the left side. The resonance frequency (fres,r) of the shielding layer may be determined by the inductance of the shielding layer and the capacitance of the resonance capacitor.

For example, in the case of (2), when a resonance capacitor of 2,300 nF is used, the resonance frequency (fres,r) of the shielding layer may be 85 to 88 kHz. For example, in the case of (3), when a 3,000 nF resonance capacitor is used, the resonance frequency (fres, r) of the shielding layer may be 74 to 77 kHz. For example, in the case of (4), when a 4,000 nF resonance capacitor is used, the resonance frequency (fres,r) of the shielding layer may be 64 to 67 kHz.

As illustrated in FIG. 15, as can be seen along the horizontal direction from the upper side, it can be seen that the strength of the magnetic field is reduced in the first embodiment (2), (3), (4) compared to the conventional case (1).

In addition, as can be seen along the horizontal direction from the lower side, it can be seen that the strength of the magnetic field decreases as the resonance frequency of the shielding layer decreases.

In addition, as can be seen along the vertical direction on the left side, it can be seen that the strength of the magnetic field decreases as the coupling coefficient k0r between the transmission coil and the shielding layer decreases.

Figure 16:
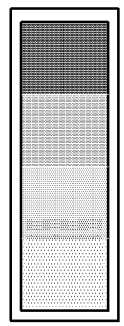
FIG. 16 illustrates a magnetic field distribution according to the capacitance of a resonance capacitor when the shielding layer is composed of two layers of pattern coils.
Figure 16:
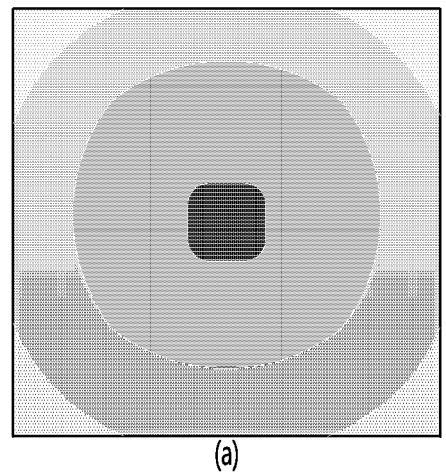
Figure 16:
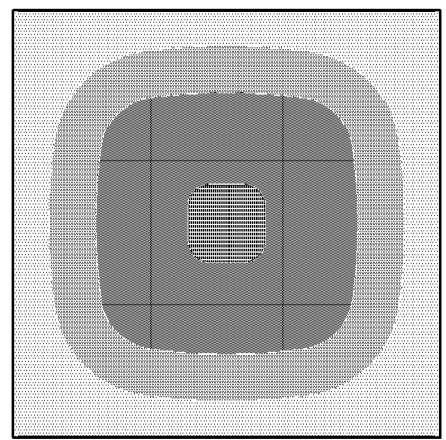
Figure 16:
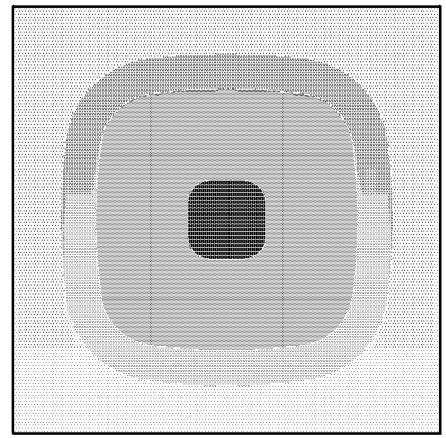
Figure 17:
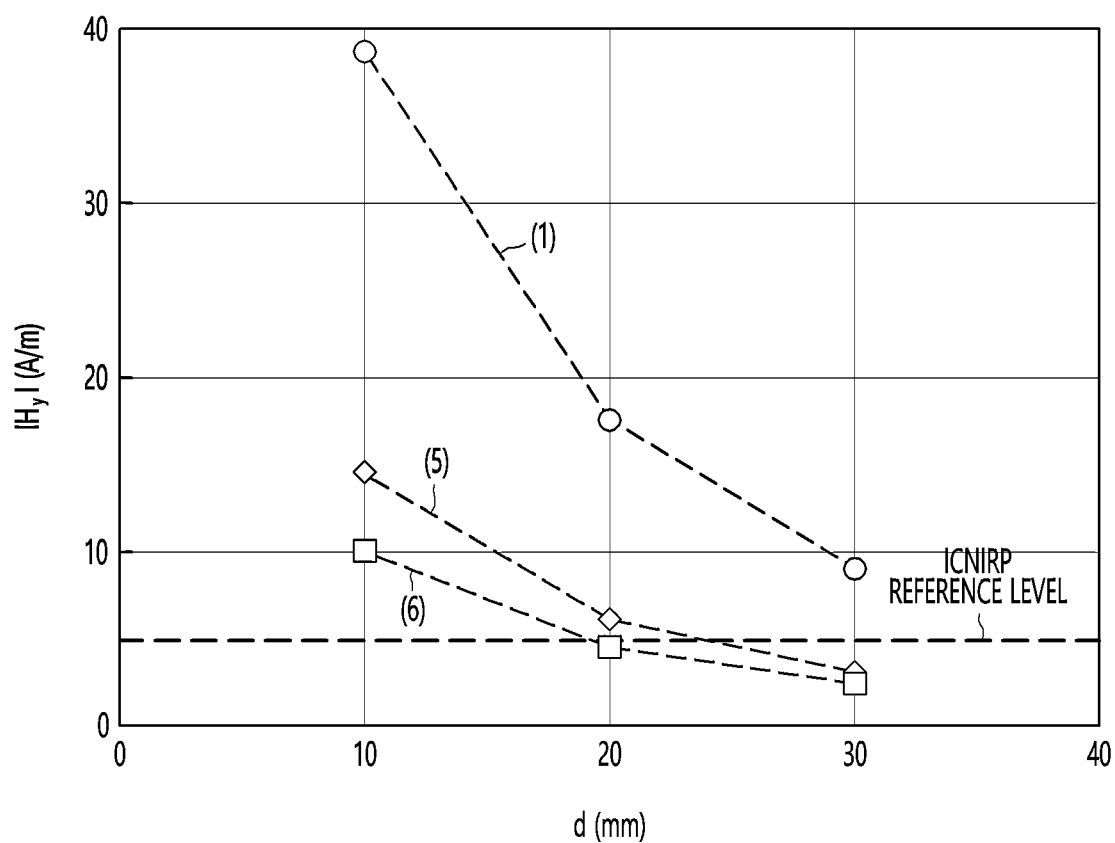
FIG. 17 illustrates a leakage magnetic field according to the capacitance of a resonance capacitor when the shielding layer is composed of two layers of pattern coils.
Figure 18:
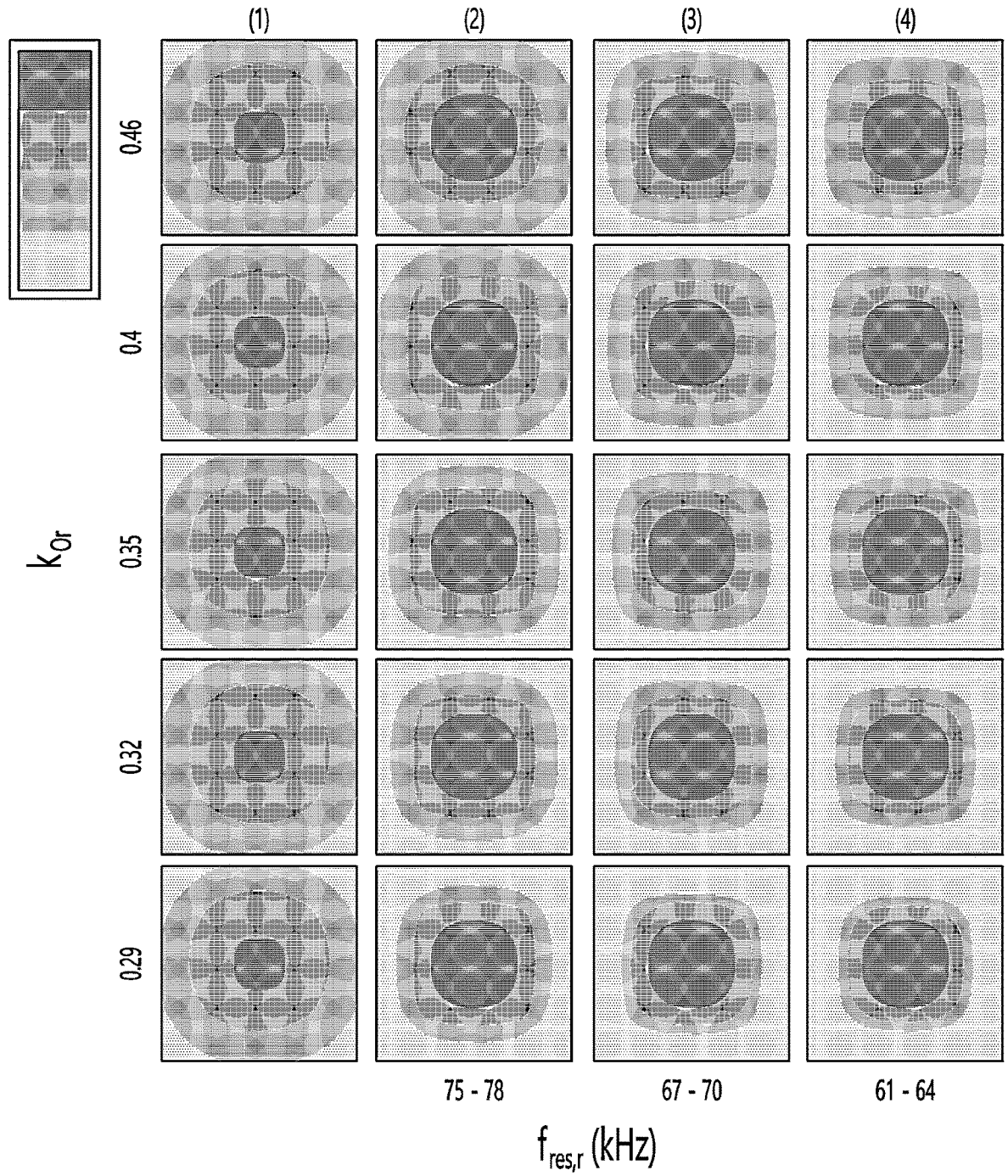
FIG. 18 illustrates a magnetic field distribution according to a relationship between a capacitance of a resonance capacitor, a resonance frequency, and a coupling coefficient when the shielding layer is composed of two layers of pattern coils.

FIG. 16 illustrates a magnetic field distribution according to the capacitance of a resonance capacitor when the shielding layer is composed of two layers of pattern coils, FIG. 17 illustrates a leakage magnetic field according to the capacitance of a resonance capacitor when the shielding layer is composed of two layers of pattern coils, and FIG. 18 illustrates a magnetic field distribution according to a relationship between a capacitance of a resonance capacitor, a resonance frequency, and a coupling coefficient when the shielding layer is composed of two layers of pattern coils.

FIGS. 16 to 18 are test results for a case where the shielding layer includes two layers of pattern coils in the second embodiment (FIGS. 8 and 9).

Compared to the prior art (FIG. 16a), as in the second embodiment (FIG. 16b, FIG. 16c), the shielding layer including the two layers of pattern coils is provided, and as the resonance capacitor increases, the strength of the magnetic field decreases. For example, when an 800 nF resonance capacitor is used (FIG. 16b), the strength of the magnetic field may be reduced compared to the conventional case (FIG. 16a). When a 1,000 nF resonance capacitor is used (FIG. 16c), the strength of the magnetic field may be reduced compared to a case where an 800 nF resonance capacitor is used (FIG. 16b).

In FIG. 17, the conventional case (FIG. 16a) is (1), the case where an 800 nF resonance capacitor is used (FIG. 16b) may be (5), and the case where a 1,000 nF resonance capacitor is used (FIG. 16c) may be (6).

Overall, (1) has a much larger leakage magnetic field than (5) and (6). Therefore, when the capacitor values of the resonance capacitors are different according to the second embodiment, it can be seen that the leakage magnetic field is significantly lower than that of the conventional case (1). Here, the leakage magnetic field may be a magnetic field on the side of the transmission coil.

In particular, in the conventional case (1), commercialization is difficult because it exceeds the ICNIRP standard level, but since, in the case of the second embodiment (5), (6), it can be managed at the ICNIRP standard level or less at a distance of 20 mm or more from the transmission coil, commercialization is possible.

In FIG. 18, the conventional case (1) and the second embodiment (5), (6), (7) are illustrated along the horizontal direction from the upper side, and the resonance frequency (fres, r) is illustrated along the horizontal direction from the lower side, and the coupling coefficient k0r between the transmission coil and the shielding layer is illustrated along the longitudinal direction on the left side. (7) is the case where a 1,200 nF resonance capacitor is used. The resonance frequency (fres,r) of the shielding layer may be determined by the inductance of the shielding layer and the capacitance of the resonance capacitor.

For example, in the case of (5), when a resonance capacitor of 800 nF is used, the resonance frequency (fres,r) of the shielding layer may be 75 to 78 kHz. For example, in the case of (6), when a 1,000 nF resonance capacitor is used, the resonance frequency (fres, r) of the shielding layer may be 67 to 70 kHz. For example, in the case of (7), when a resonance capacitor of 1,200 nF is used, the resonance frequency (fres,r) of the shielding layer may be 61 to 64 kHz.

As illustrated in FIG. 18, as can be seen along the horizontal direction from the upper side, it can be seen that the strength of the magnetic field is reduced in the second embodiment (5), (6), (7) compared to the conventional case (1).

In addition, as can be seen along the horizontal direction from the lower side, it can be seen that the magnetic field intensity decreases as the resonance frequency (fres,r) of the shielding layer decreases.

In addition, as can be seen along the vertical direction on the left side, it can be seen that the strength of the magnetic field decreases as the coupling coefficient k0r between the transmission coil and the shielding layer decreases.

Figure 19:
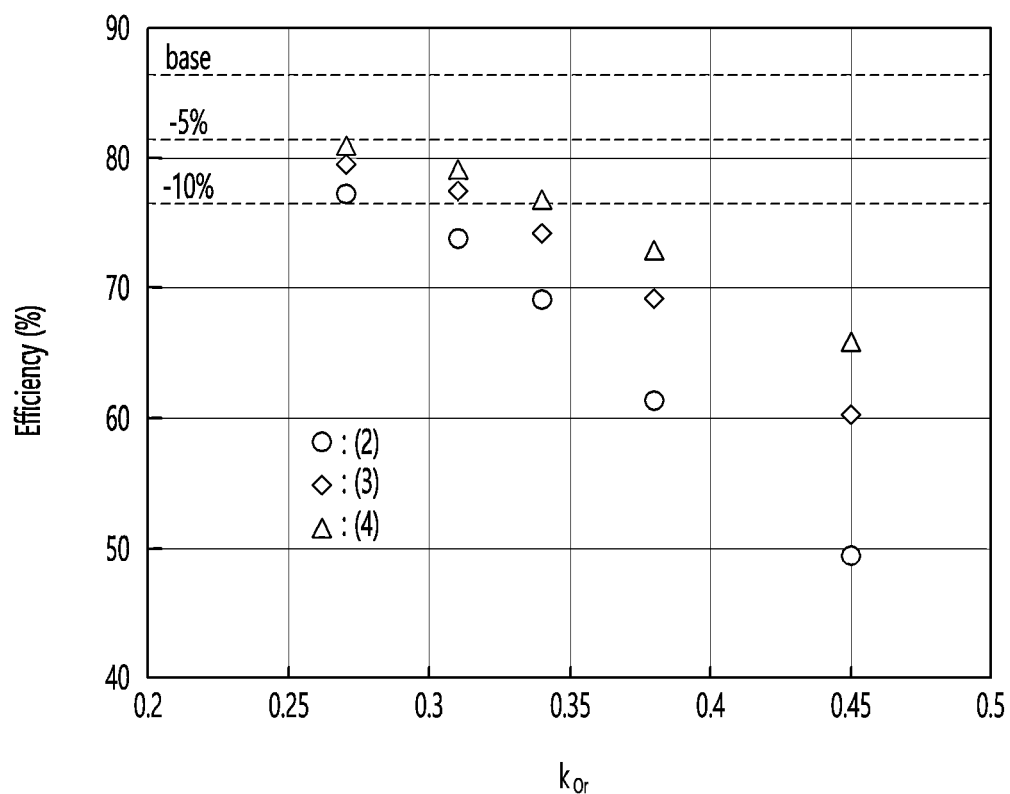
FIG. 19 illustrates transmission efficiency according to the capacitance of a resonance capacitor when the shielding layer is composed of one layer of pattern coil.
Figure 20:
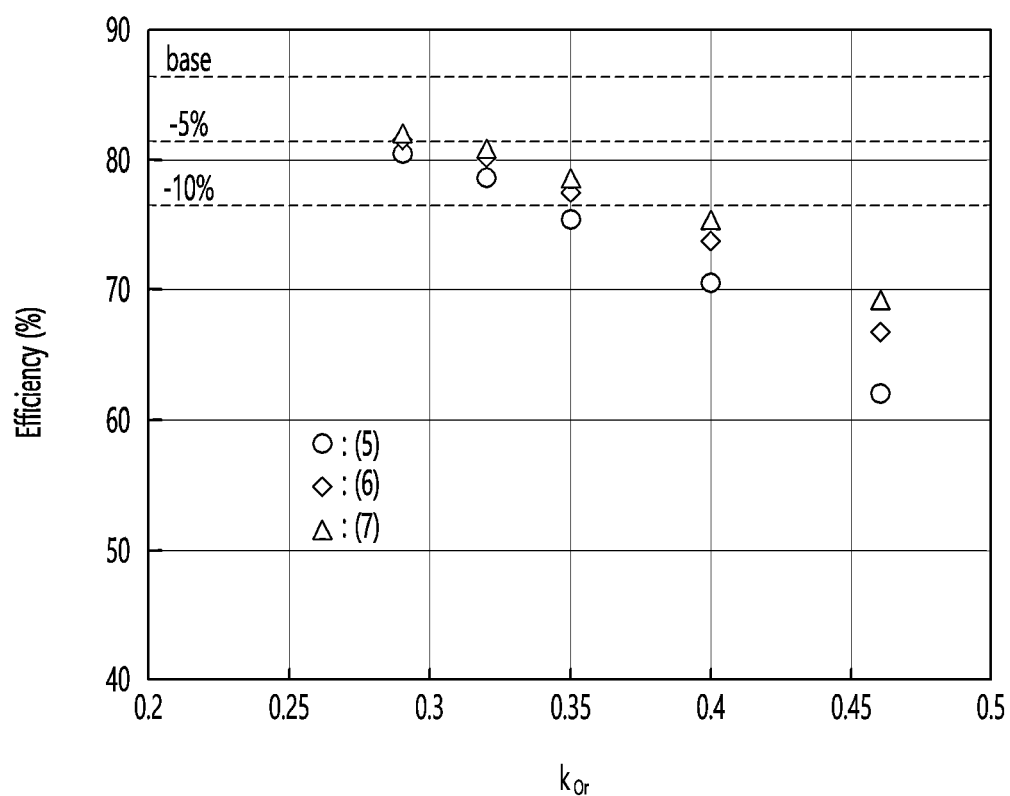
FIG. 20 illustrates transmission efficiency according to the capacitance of a resonance capacitor when the shielding layer is composed of two layers of pattern coils.

FIG. 19 illustrates transmission efficiency according to the capacitance of a resonance capacitor when the shielding layer is composed of one layer of pattern coil, and FIG. 20 illustrates transmission efficiency according to the capacitance of a resonance capacitor when the shielding layer is composed of two layers of pattern coils.

As illustrated in FIG. 19, in the first embodiment (2), (3), and (4), the transmission efficiency may increase as the capacitor value of the resonance capacitor increases. In addition, transmission efficiency may increase as the coupling coefficient between the transmission coil and the shielding layer decreases.

As illustrated in FIG. 20, in the second embodiment (5), (6), and (7), as the capacitor value of the resonance capacitor increases, the transmission efficiency may increase. In addition, transmission efficiency may increase as the coupling coefficient between the transmission coil and the shielding layer decreases.

In FIGS. 19 and 20, when the coupling coefficient between the transmission coil and the shielding layer increases, the current induced by the shielding layer by the magnetic field generated by the transmission coil increases, and the magnetic field generated by the increased current may also increase. Therefore, since the magnetic field generated by the shielding layer offsets or suppresses even the magnetic field formed from the transmission coil to the front wireless power reception apparatus on the front thereof, transmission efficiency may be reduced.

Figure 21:
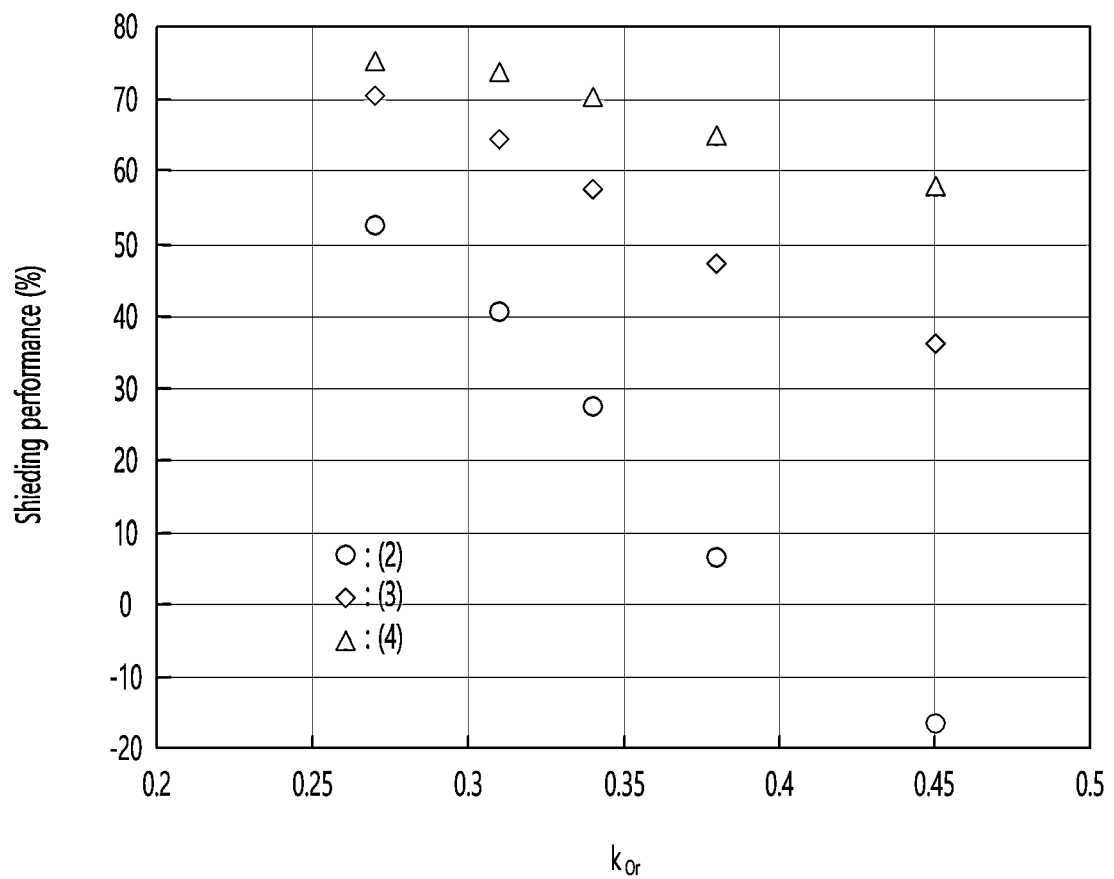
FIG. 21 illustrates shielding performance according to the capacitance of a resonance capacitor when the shielding layer is composed of one layer of pattern coil.
Figure 22:
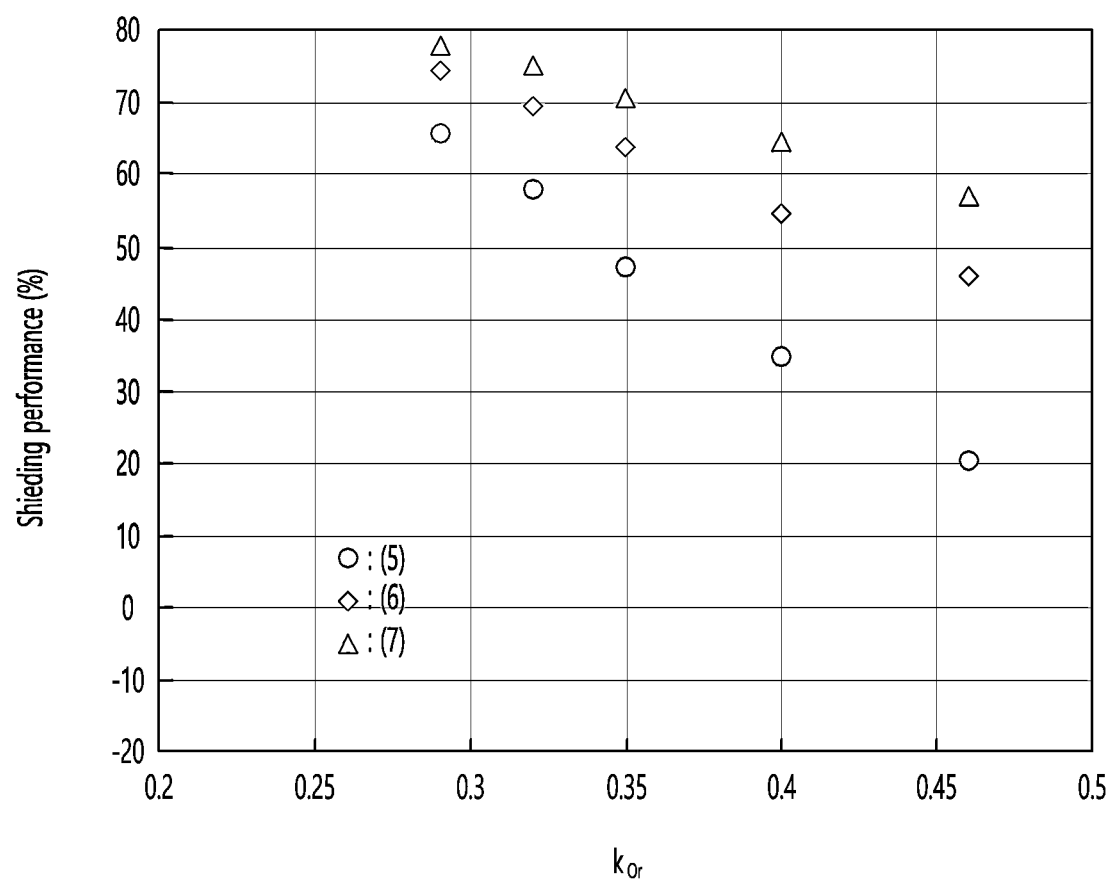
FIG. 22 illustrates shielding performance according to the capacitance of a resonance capacitor when the shielding layer is composed of two layers of pattern coils.

FIG. 21 illustrates shielding performance according to the capacitance of a resonance capacitor when the shielding layer is composed of one layer of pattern coil, and FIG. 22 illustrates shielding performance according to the capacitance of a resonance capacitor when the shielding layer is composed of two layers of pattern coils.

As illustrated in FIG. 21, in the first embodiments (2), (3), and (4), shielding performance may increase as the capacitor value of the resonance capacitor increases. In addition, as the coupling coefficient between the transmission coil and the shielding layer decreases, shielding performance may increase.

As illustrated in FIG. 22, in the second embodiment (5), (6), and (7), shielding performance can be increased as the capacitor value of the resonance capacitor increases. In addition, as the coupling coefficient between the transmission coil and the shielding layer decreases, shielding performance may increase.

In FIGS. 21 and 22, when the coupling coefficient between the transmission coil and the shielding layer increases, the current induced by the shielding layer by the magnetic field generated by the transmission coil increases, and the magnetic field generated by this increased current may also increase. Therefore, the magnetic field generated by the shielding layer is more than enough to offset the magnetic field formed on the side of the transmission coil, and the remaining magnetic field is lost as a leakage magnetic field, resulting in reduced shielding performance.

Therefore, when the coupling coefficient between the transmission coil and the shielding layer is large, shielding performance can be increased by using a resonance capacitor having a large capacitance value.

Figure 23:
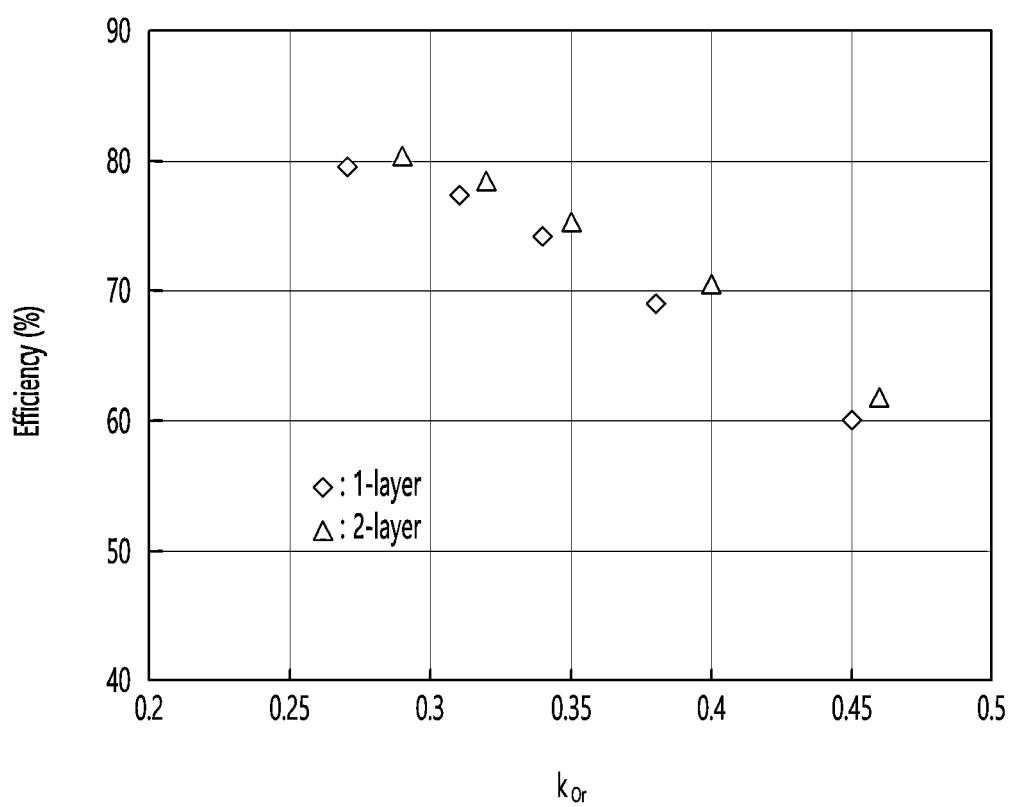
FIG. 23 illustrates transmission efficiency according to coupling coefficients in each of one layer of pattern coil and two layers of pattern coils.
Figure 24:
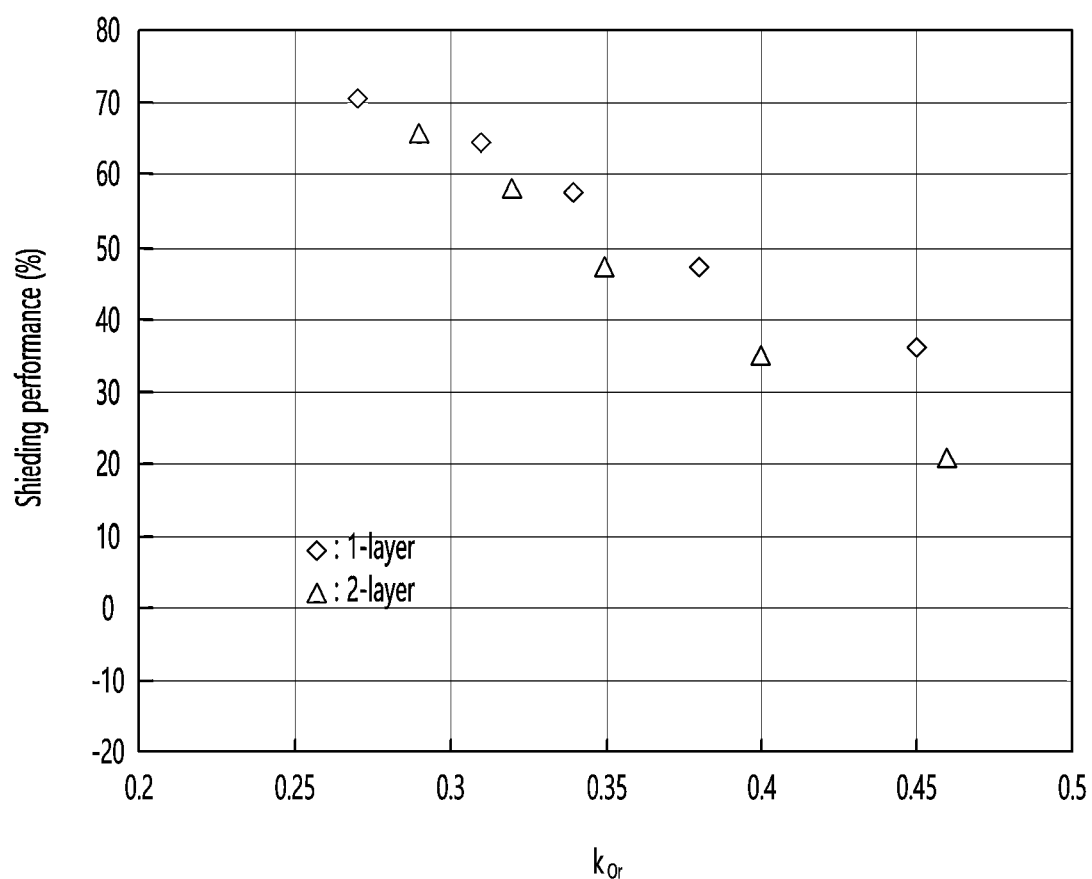
FIG. 24 illustrates shielding performance according to coupling coefficients in each of one layer of pattern coil and two layers of pattern coils.

FIG. 23 illustrates transmission efficiency according to coupling coefficients in each of one layer of pattern coil and two layers of pattern coils, and FIG. 24 illustrates shielding performance according to coupling coefficients in each of one layer of pattern coil and two layers of pattern coils.

In FIGS. 23 and 24, a shielding layer and a resonance capacitor having a resonance frequency of 74 to 78 kHz was used.

As illustrated in FIG. 23, it can be seen that the shielding layer having two layers of pattern coils (second embodiment) has higher transmission efficiency than the shielding layer having one layer of pattern coils (first embodiment).

As illustrated in FIG. 24, when the coupling coefficient between the transmission coil and the shielding layer exceeds 0.3, a shielding layer having one layer of patterned coils (first embodiment) is superior in shielding performance to a shielding layer having two layers of patterned coils (second embodiment). When the coupling coefficient between the transmission coil and the shielding layer is 0.3 or less, the shielding performance is similar between the shielding layer having one layer of pattern coils (first embodiment) and the shielding layer having two layers of pattern coils (second embodiment).

From FIGS. 13 to 24, shielding performance can be improved without reducing transmission efficiency when the following conditions are satisfied in the embodiment.

For example, the ratio of the resonance frequency of the shielding layer to the driving frequency of the wireless power transmission apparatus may be 0.7 or less.

For example, the difference between the driving frequency of the wireless power transmission apparatus and the resonance frequency of the shielding layer may be 55 kHz or less.

For example, a coupling coefficient between the transmission coil and the shielding layer may be 0.35 or less.

The above detailed description should not be construed as limiting in all respects and should be considered illustrative. The scope of the embodiments should be determined by reasonable interpretation of the appended claims, and all changes within the equivalent range of the embodiments are included in the scope of the embodiments.

The embodiment can be variously applied to overall industries such as IT, vehicle, railway, and home appliance industries as well as mobile.

The invention claimed is:

1. A wireless power transmission apparatus, comprising:
a shielding plate;
a transmission coil on the shielding plate; and
a shielding member disposed on the shielding plate and configured to surround the transmission coil,
wherein the shielding member includes:
a base substrate including an opening;
a shielding layer disposed on the base substrate and configured to surround the transmission coil; and
a resonance capacitor mounted on the base substrate and connected to the shielding layer,
wherein the shielding layer includes two or more layers of pattern coils vertically overlapped,
wherein the base substrate includes vias, and
wherein the base substrate is disposed between three or more layers of pattern coils.

2. The wireless power transmission apparatus of claim 1, wherein the shielding layer includes a pattern coil disposed on the base substrate.

3. The wireless power transmission apparatus of claim 1, wherein the three or more layers of pattern coils are connected through the vias.

4. The wireless power transmission apparatus of claim 1, wherein the shielding layer has a shape corresponding to a shape of the transmission coil.

5. The wireless power transmission apparatus of claim 1, wherein the shielding layer includes metal.

6. The wireless power transmission apparatus of claim 1, wherein the transmission coil is disposed in the opening.

7. The wireless power transmission apparatus of claim 6, wherein the diameter of the opening is equal to or greater than the size of the transmission coil.

8. The wireless power transmission apparatus of claim 6, wherein the opening is a closed loop opening corresponding to a shape of the transmission coil.

9. The wireless power transmission apparatus of claim 1, wherein the transmission coil and the base substrate are disposed on the same surface.

10. The wireless power transmission apparatus of claim 1, wherein the shielding layer is spaced apart from the outside of the transmission coil.

11. The wireless power transmission apparatus of claim 1, further comprising a controller controlling a coupling coefficient between the transmission coil and the shielding layer is 0.35 or less.

12. The wireless power transmission apparatus of claim 1, wherein the base substrate comprises a rigid base substrate or a flexible base substrate.

13. The wireless power transmission apparatus of claim 1, wherein the shield member generates a second current obtained by inverting a phase of a first current flowing in the transmission coil.

14. The wireless power transmission apparatus of claim 1, wherein the shield member generates a second magnetic field for offsetting a first magnetic field generated by the transmission coil.

* * * * *